April 18, 1933. S. A. SWANSON 1,904,633
REPRODUCING PNEUMATIC OPERATOR FOR TYPEWRITERS
Filed Oct. 26, 1928 18 Sheets-Sheet 2

Witness
William P. Kilroy

Inventor
Selviyor A. Swanson
By Hill & Hill

April 18, 1933. S. A. SWANSON 1,904,633
REPRODUCING PNEUMATIC OPERATOR FOR TYPEWRITERS
Filed Oct. 26, 1928 18 Sheets-Sheet 4

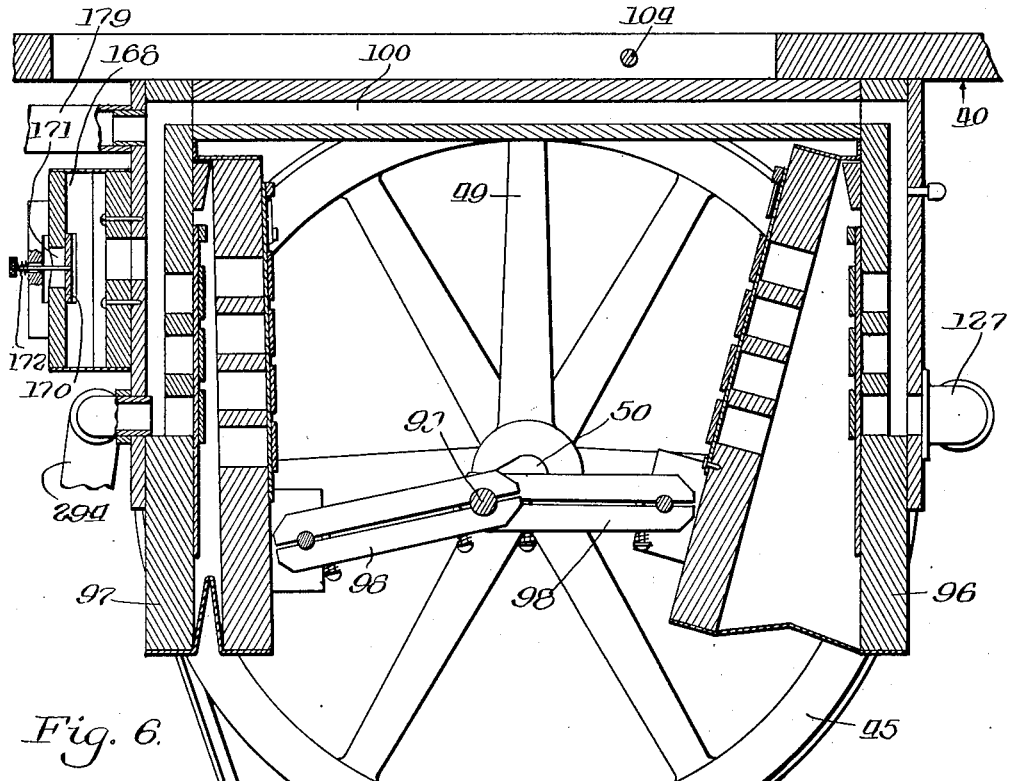
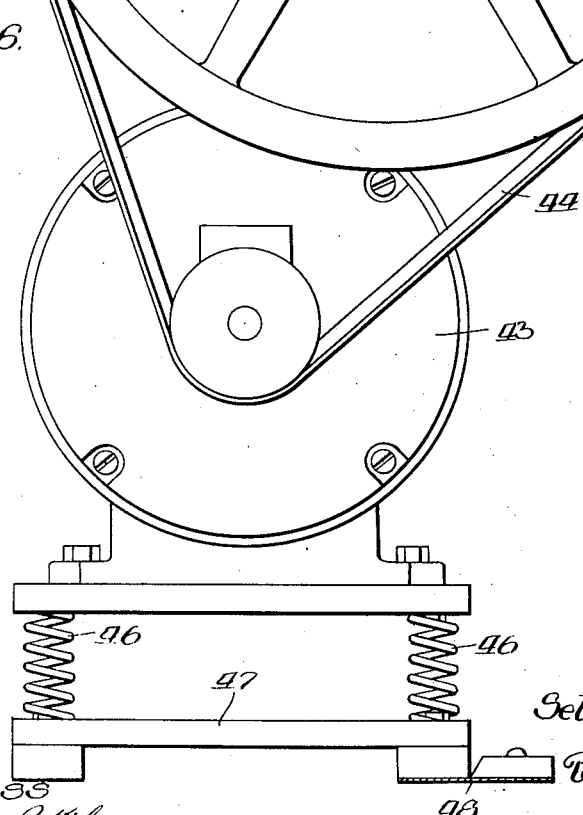
Fig. 6.

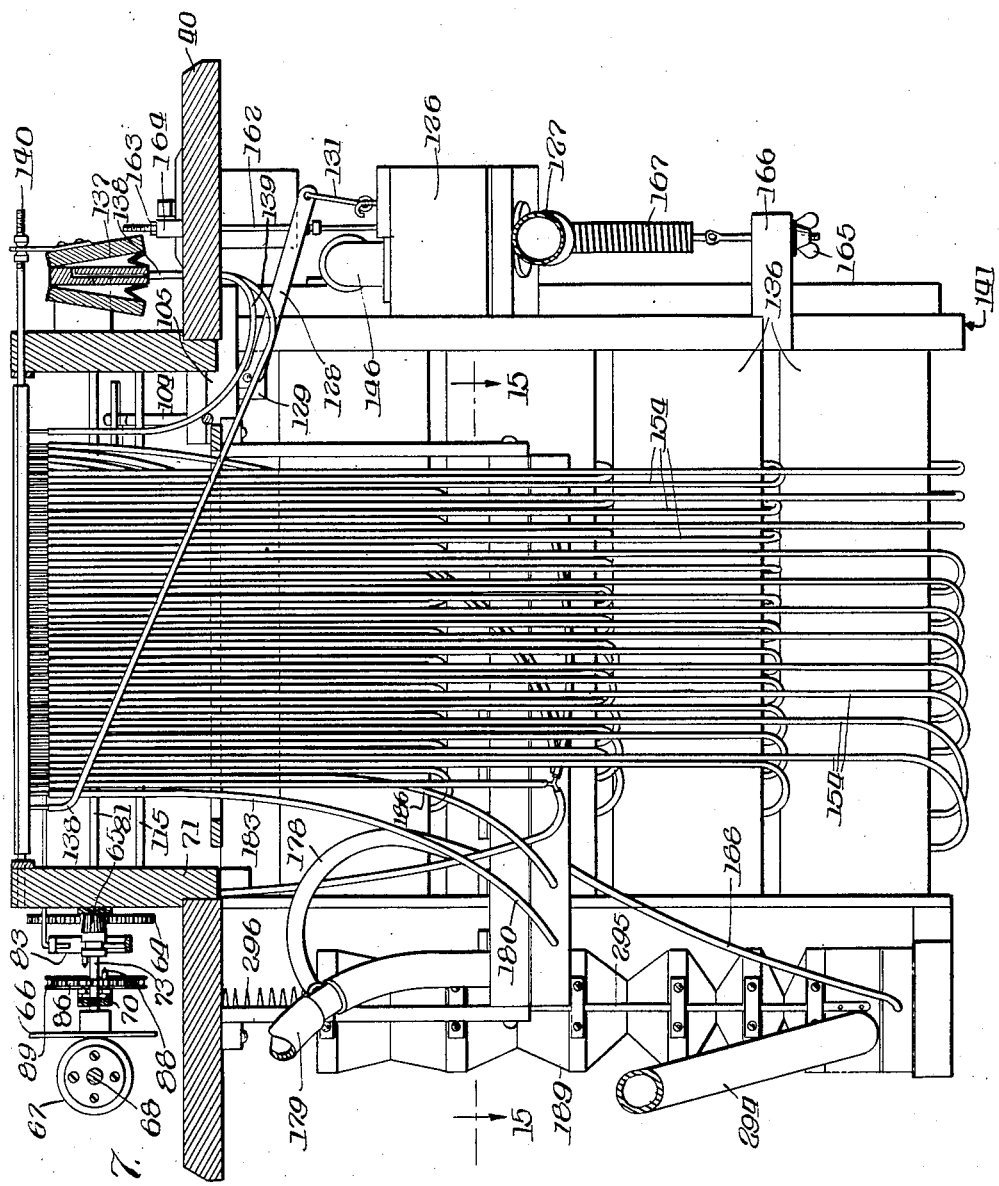

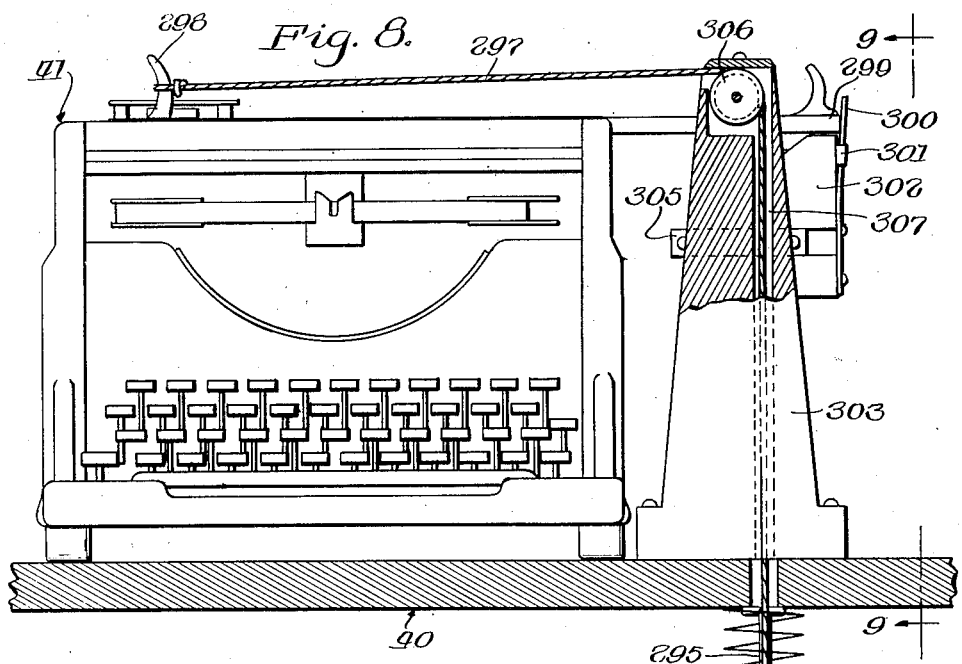
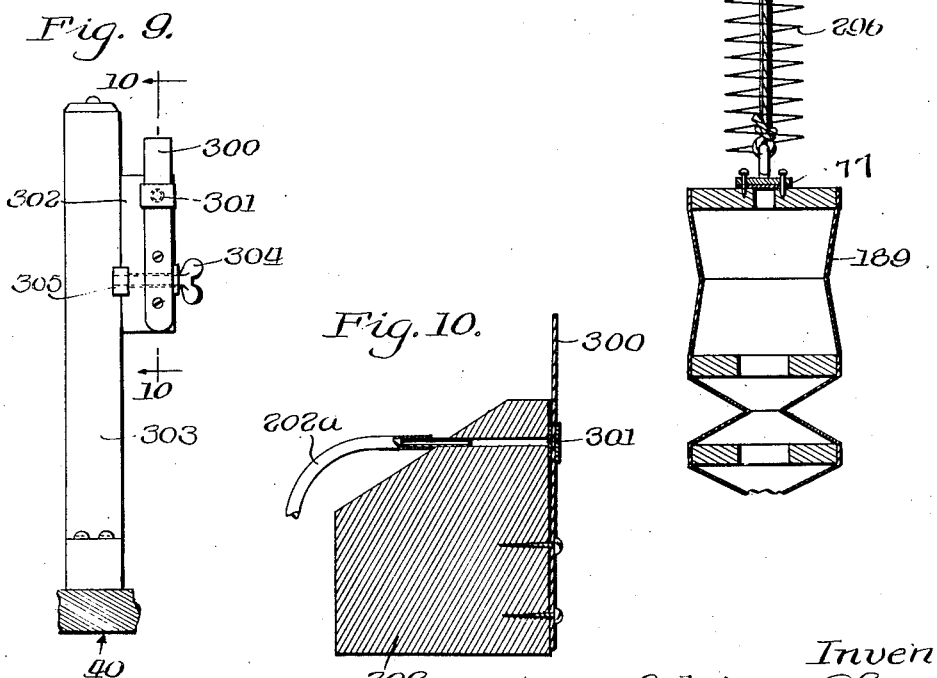

April 18, 1933.     S. A. SWANSON     1,904,633
REPRODUCING PNEUMATIC OPERATOR FOR TYPEWRITERS
Filed Oct. 26, 1928     18 Sheets-Sheet 9
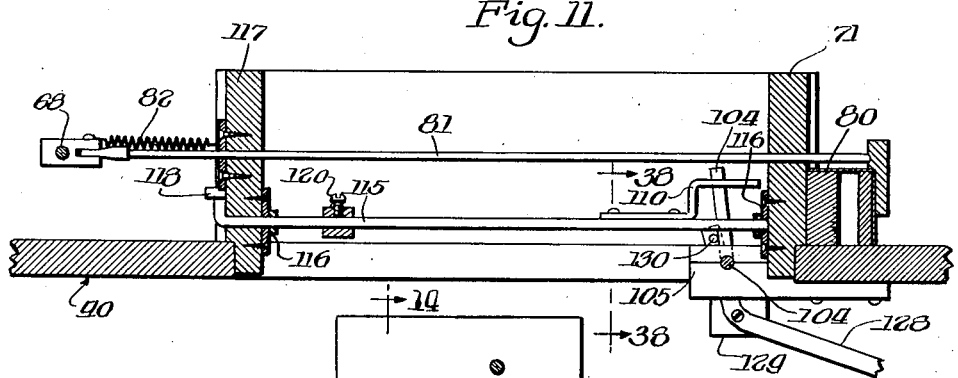
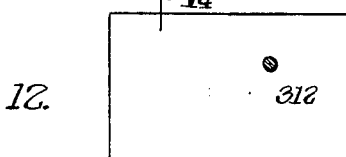
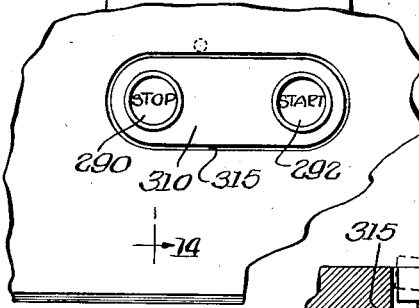
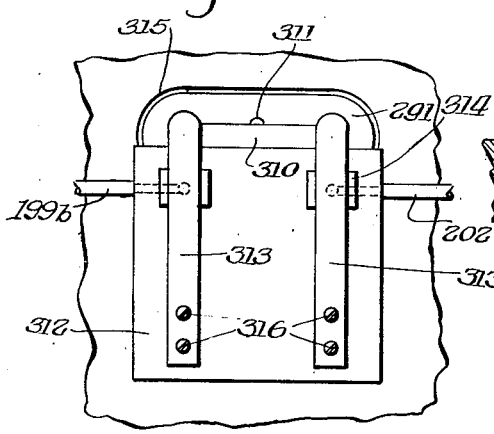
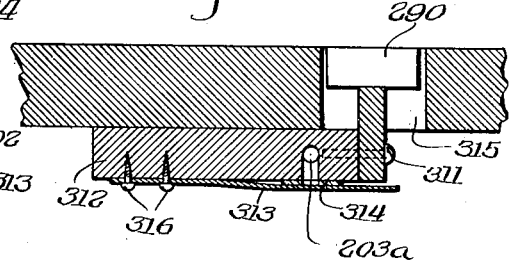
Witness
William P. Kilroy
Inventor,
Selwyor A. Swanson
By Hill & Hill
Atty April 18, 1933. S. A. SWANSON 1,904,633
REPRODUCING PNEUMATIC OPERATOR FOR TYPEWRITERS
Filed Oct. 26, 1928 18 Sheets-Sheet 10
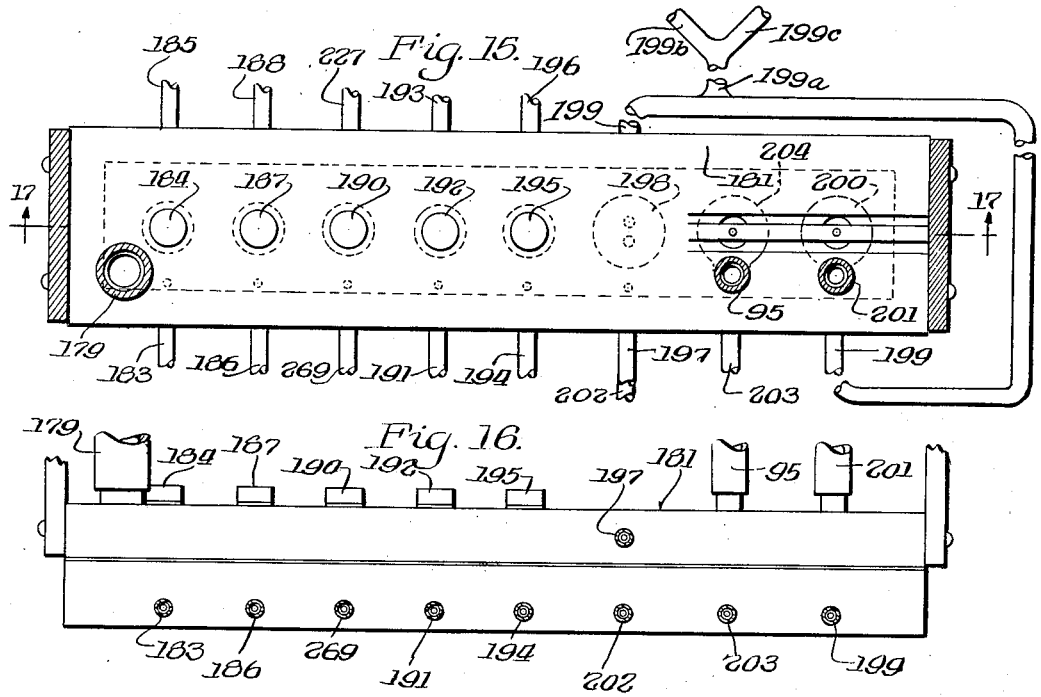
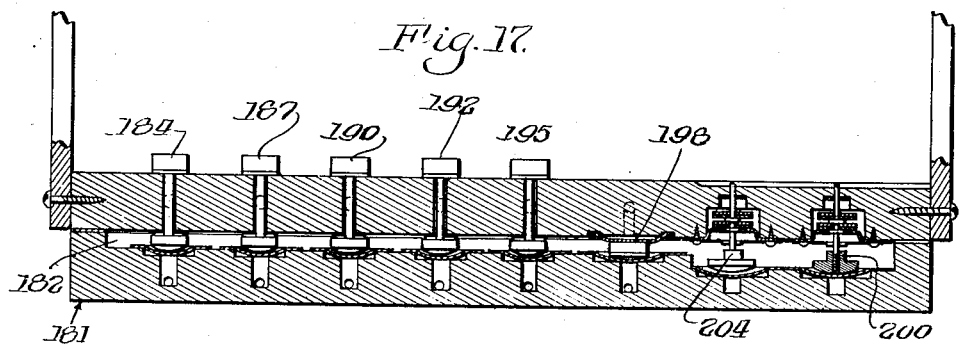
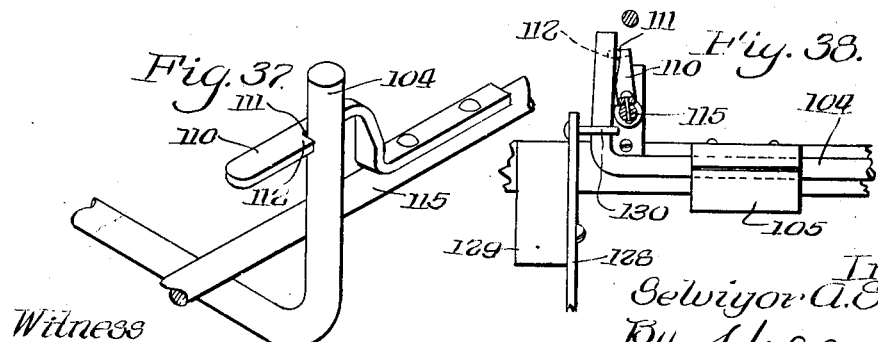
Inventor
Selwyor A. Swanson
By Hill & Hill
Attys.
Witness
William P. Kilroy

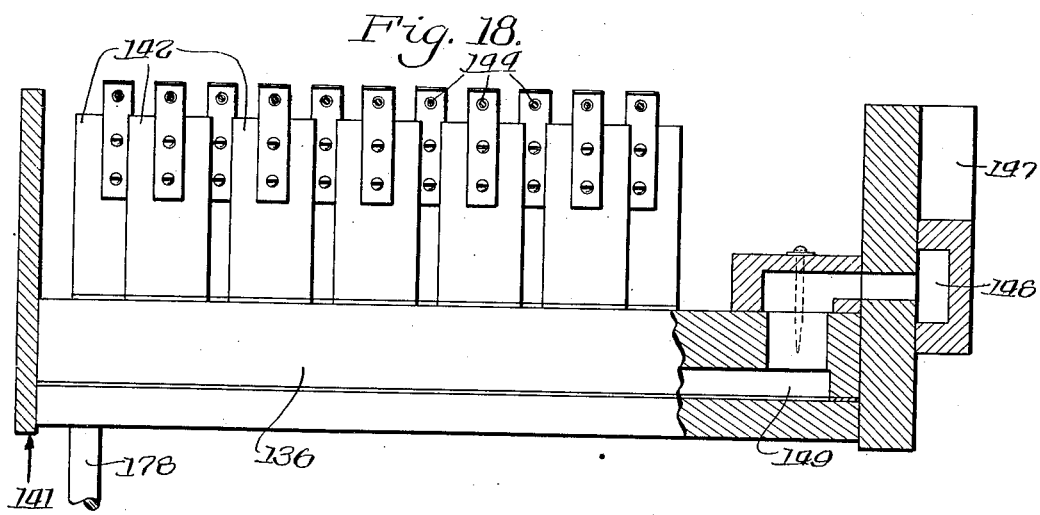
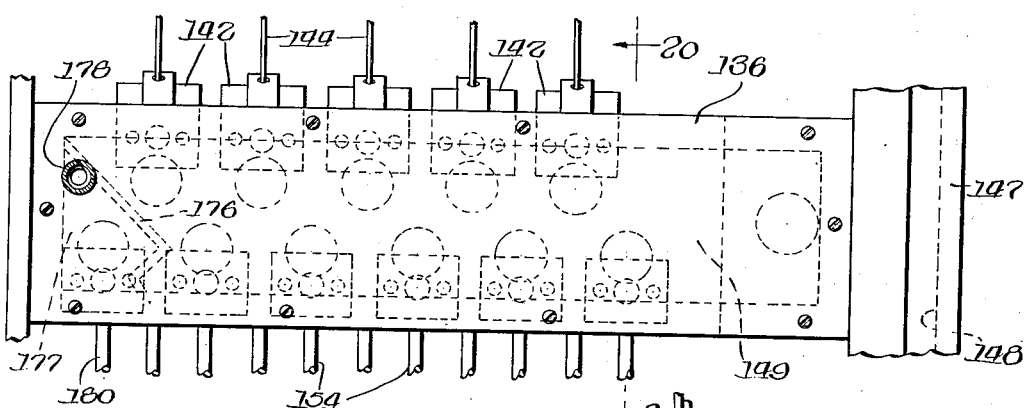
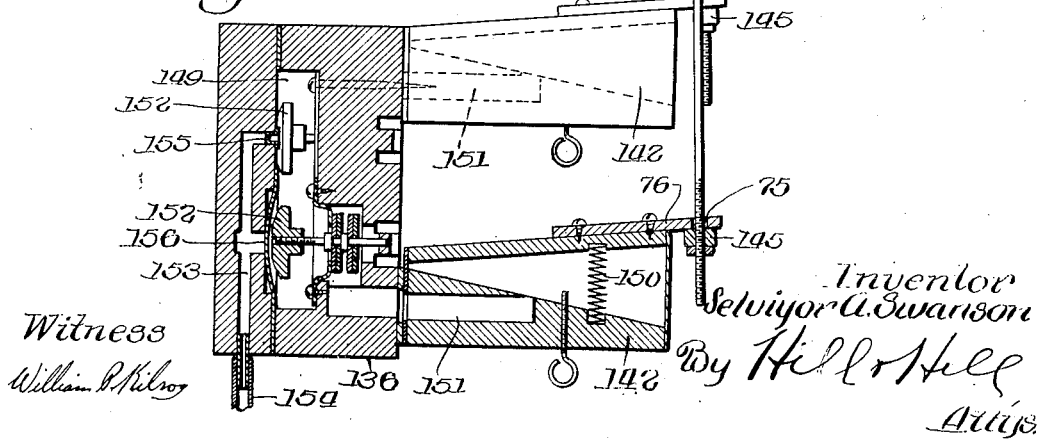

April 18, 1933.   S. A. SWANSON   1,904,633
REPRODUCING PNEUMATIC OPERATOR FOR TYPEWRITERS
Filed Oct. 26, 1928   18 Sheets-Sheet 12

Witness
William P. Kilroy

Inventor
Selviyor A. Swanson
By Hill & Hill
Attys.

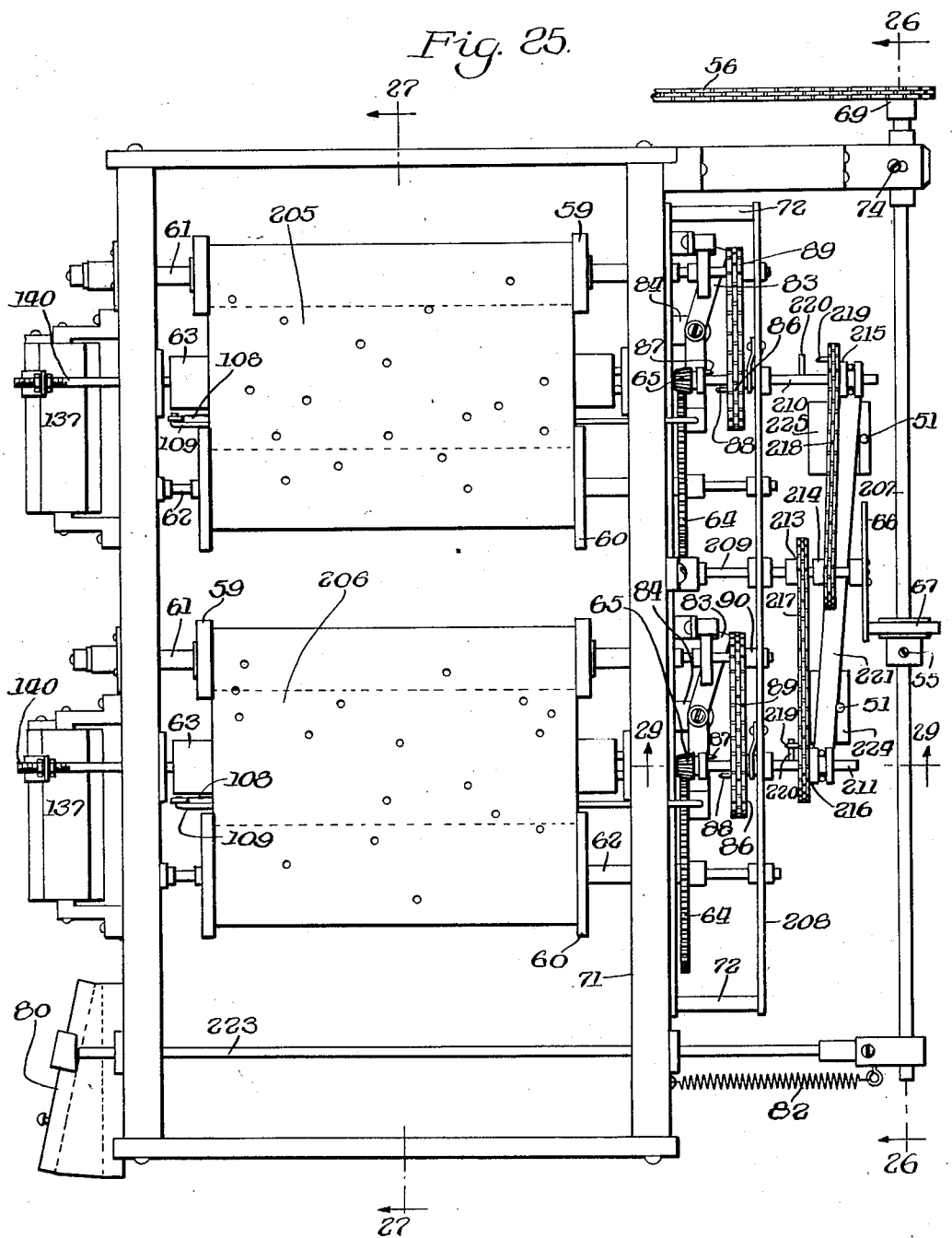

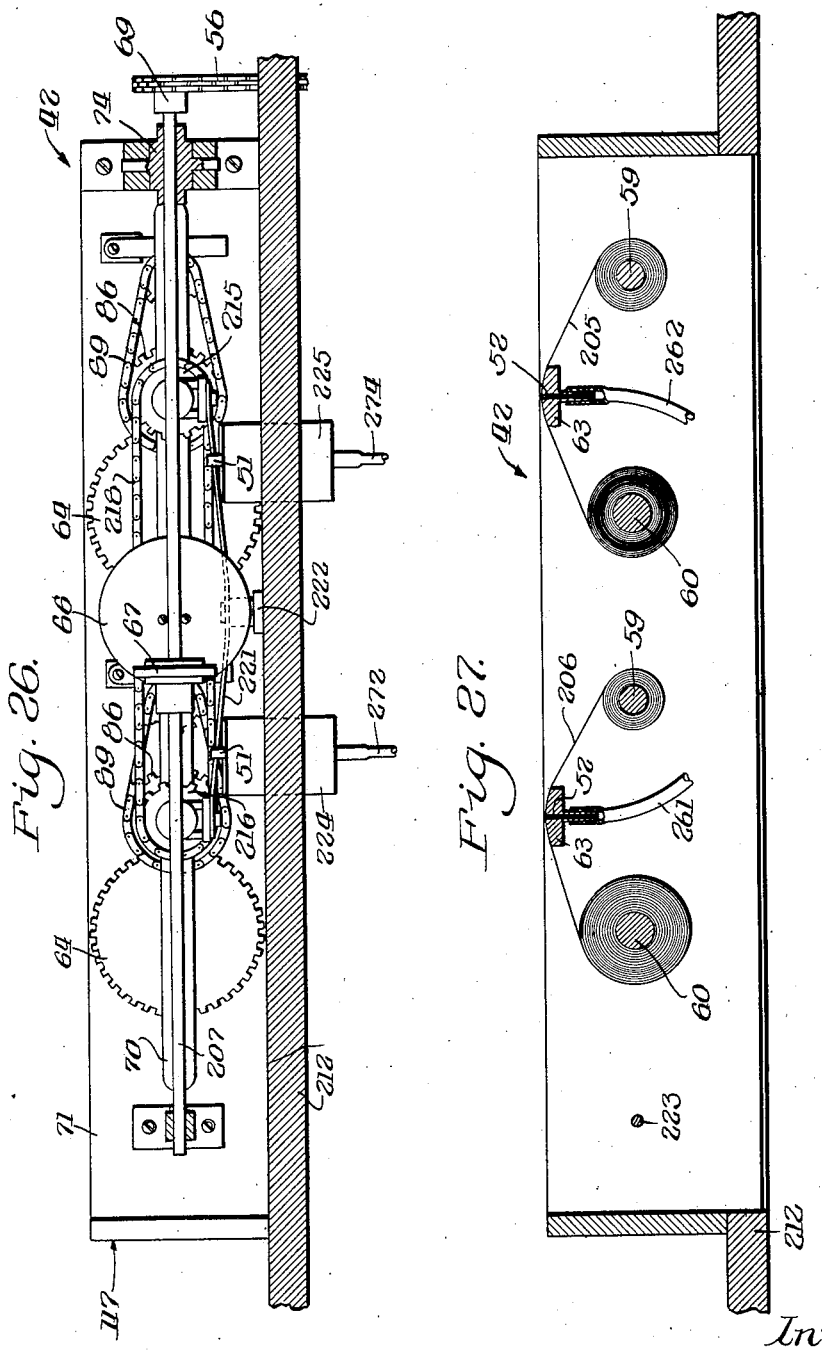

April 18, 1933.   S. A. SWANSON   1,904,633
REPRODUCING PNEUMATIC OPERATOR FOR TYPEWRITERS
Filed Oct. 26, 1928   18 Sheets-Sheet 15

Witness
William P. Kilroy

Inventor
Selviyor A. Swanson
By Hill & Hill
Attys.

April 18, 1933.  S. A. SWANSON  1,904,633
REPRODUCING PNEUMATIC OPERATOR FOR TYPEWRITERS
Filed Oct. 26, 1928   18 Sheets-Sheet 16

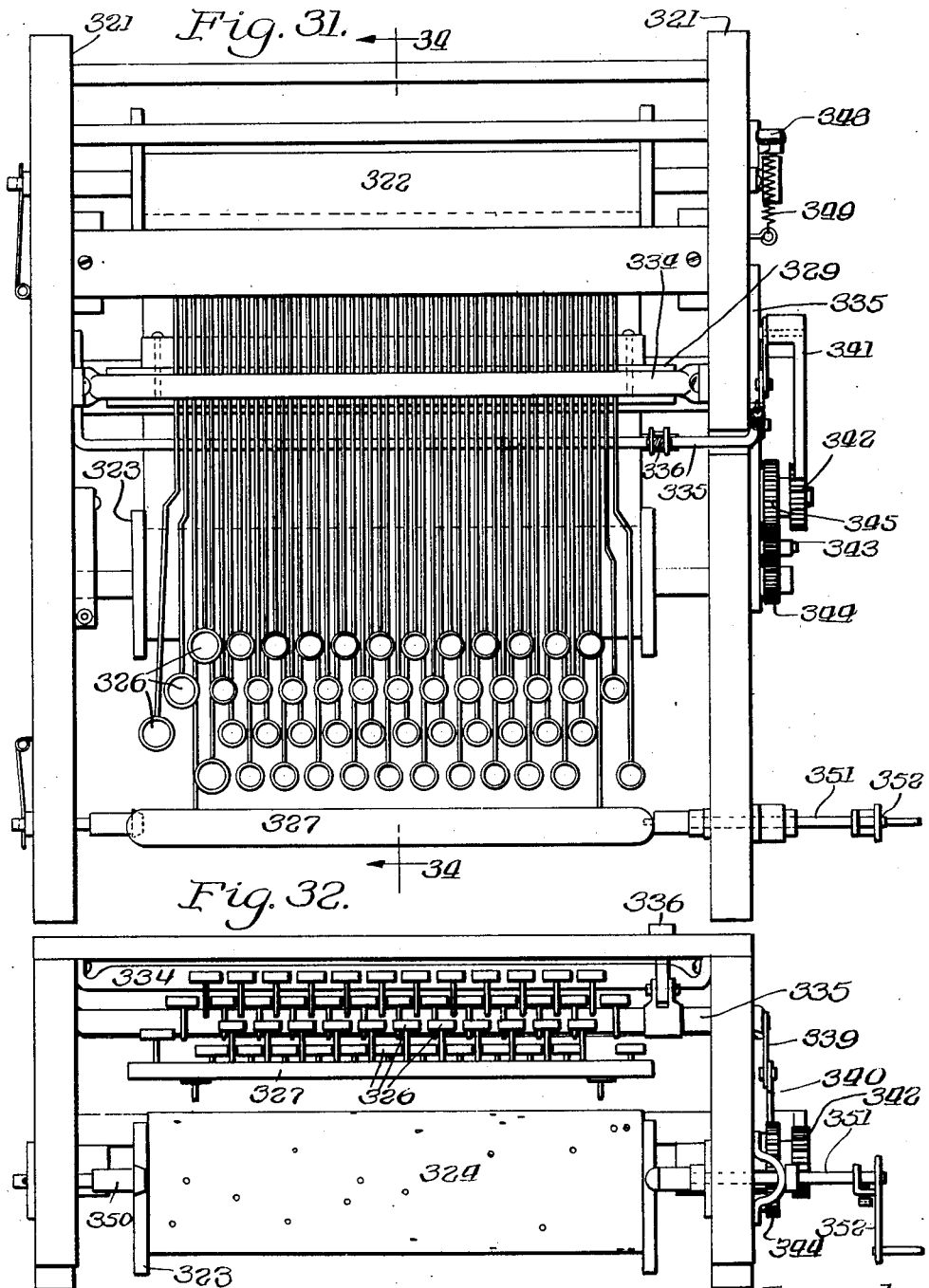

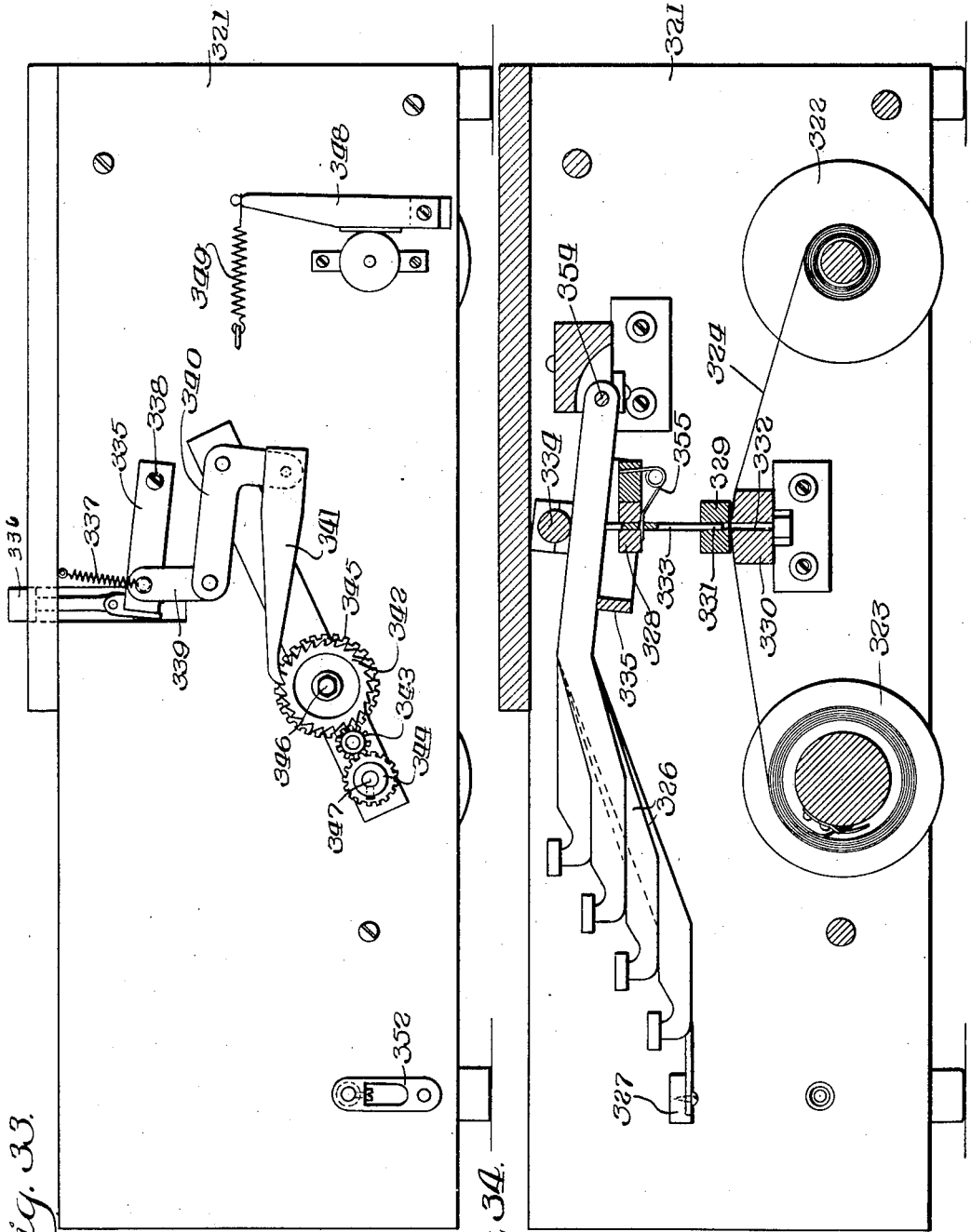

UNITED STATES PATENT OFFICE

SELVIYOR A. SWANSON, OF CHICAGO, ILLINOIS

REPRODUCING PNEUMATIC OPERATOR FOR TYPEWRITERS

Application filed October 26, 1928. Serial No. 315,250.

This invention relates to power driven typewriter operators and is of the general type of such machines in which the typewriting instrumentalities are actuated by a plurality or a battery of power pneumatics which are in turn controlled by master letters or stencil sheets arranged to travel across tracker bars.

The purpose of the attachment is to provide for the automatic typing of a large number of writings or of letters containing substantially the same material and each of which is addressed to a different individual, but wherein it may be desired to insert material of a personal nature in each letter or document. In the construction principally illustrated in Figs. 1 to 24, inclusive, of the drawings only one master letter or stencil sheet is provided. This sheet is adapted for controlling the repeated typing of the main body of a letter or the like and provides for automatically stopping the attachment to permit the person in charge to manually insert or type material personal to the party addressed and then to again start the attachment to continue the automatic reproduction of the main body of the writing or letter in accordance with the master letter or stencil sheet. Provision may be made for any desired number of such manual insertions in different portions of the writing, the insertions being made to include salutations or the like. This manual operation is accomplished without in any way changing the connection of the attachment to the typewriter.

In the construction illustrated by Figs. 25 to 30, inclusive, the typewriting instrumentalities are operated by pneumatic actuators separately controlled by two master letters or stencil sheets moving over separate tracker bars.

In the embodiment wherein I have provided two such master letters or stencil sheets and tracker bars, I have also provided means for causing the sheets to operate one at a time alternately or intermittently so that the machine may be under the control of one or the other of the stencil sheets as the occasion requires. This embodiment also permits manual operation without disconnecting the attachment.

I have also provided means for shifting the control from one stencil sheet to the other and the shifting is preferably accomplished automatically by means of the sheets themselves so that when one of the sheets has completed its particular portions of the work to be done it may present a suitable perforation to its tracker bar whereby its own action ceases and the other sheet is caused to become active. In general the purpose of using two seats is to utilize one for reproducing subject matter common to all the writings to be produced, as for instance, the body of a circular letter, while the other sheet is preferably devoted exclusively to matter especially adapted for each letter, such for example as the salutations and addresses, and the personal matter appropriate to the particular addressee. The special matter stencil sheet is the one usually first active and thereafter the other of the stencil sheets becomes active. The two stencil sheets may become intermittently active several times while producing a single writing or letter.

The stencil sheets are elongated sheets of perforated paper similar in some respects to the perforated sheets used in player pianos or other automatic musical players, in which the stencil sheet acts as a valve controlling the admission of air through apertures in a tracker bar. The tracker bar has a plurality of apertures preferably arranged in a longitudinal row and each connected by a separate tube to one of a plurality of power pneumatics. The perforated stencil sheet is moved forwardly over the tracker bar sealing the apertures therein except when a perforation comes into register with and momentarily unseals an aperture in the tracker bar whereupon the particular power pneumatic with which the unsealed aperture is connected collapses. The collapse of the power pneumatic actuates the particular movable element or instrumentality of the typewriter with which the pneumatic is connected. The power by which the pneumatics are actuated is developed by mechanically operated air pumps or bellows which serve to maintain air at low pressure in a system of conduits with which the various pneumatics are intermittently connected by the movement of the stencil sheet over the tracker bar. This group of power pneumatics, fifty of which are shown in the drawings, comprises what is hereinafter termed the pneumatic action. Certain of these pneumatics are separably connected by a wire or a rod hanger with one of the movable instrumentalities of a typewriting machine such as, for instance, a key lever. Certain other of the power pneumatics are operatively connected with various other movable parts of the typewriter which are operable in some way other than by moving a key lever such for example as the carriage, the line space shift, etc.

Attachments for actuating typewriting machines as constructed in accordance with the present day practice merely reproduce form letters or similar writings in their entirety as many times as may be desired or make provisions for standard insertions likewise automatically reproduced. Such letters or insertions are necessarily stereotyped or standardized and are lacking in the spontaneity and the personal appeal which is desirable in business letters and it is one of the objects of my invention to provide an attachment for typewriters, of the class described, which will operate continuously to reproduce predetermined sections or portions of a form letter or other writing up to a point or points where special material or matters more personal in character are to be inserted. At such points, the attachment stops operating automatically and the operator manually manipulates the typewriter to insert the personal note or matter particularly applicable to the addressee or the recipient and then again starts the attachment to reproduce the next standard section or portion of the letter or to start another letter.

Such insertions of a personal nature when interposed between the automatically reproduced standard sections of a form letter, or the like, frequently fail to produce the desired personal appeal or result for the reason that the manually produced typed portions are heavier or lighter in weight than the automatically typed portions, thereby making it obvious to the recipient that the writing is a form letter and another object of the invention is to provide an attachment of the class described which is adjustable so as to produce automatic typing of varying degrees of weight or lightness corresponding to the particular touch of the operator whereby the manually typed portion of the letter is indistinguishable from that portion which is automatically produced under the control of the stencil sheet.

The typewriter and the attachment may be conveniently mounted upon the same table or cabinet, the only direct attachment of the two being that of the members connecting the individual power pneumatics with their respective key levers and the connection of the carriage shift with a special pneumatic by means of a cord. The rods connecting the power pneumatics with the separate key levers of the typewriter are arranged to be hooked over the shank of the lever so that no cutting, drilling or mechanical or other material changes in the typewriter parts is required.

A further object of the invention is to provide an attachment of the class described which is adapted to be connected with any standard make of typewriter, such connection being adjustable and made by the expenditure of a minimum amount of time and labor and without the necessity of any physical change in the typewriter such for instance as the drilling of holes, or the like, in the machine parts.

Still another object of the invention is to provide a mounting for a motor, which furnishes the power for actuating the attachment, said mounting being of a character which tends to keep the driving belt uniformly taut and also tends to eliminate the noises normally occasioned by vibrations of the motor.

A still further object of the invention is the provision of a mechanical rewinding apparatus which operates either automatically to rewind the master letter or stencil sheet upon completion of the advance of the sheet over the tracker bar or by manual control during such advance at any time that it may be desired to rewind the sheet.

Still another object is the provision of a novel means of control and actuation of the typewriter carriage during its return movement.

A still further object is the provision of improved means for starting and stopping the movement of the respective stencil sheets over their respective tracker bars in the embodiment wherein I have provided an attachment equipped with a stencil sheet for producing the main body of the letter and a separate stencil sheet for producing a salutation or an insert.

In sheets 17 and 18 of the drawings, I have shown a manually operated perforating machine through which a blank sheet of paper is adapted to be fed and perforated to form the stencil sheets. The machine is provided with a system of key levers, which substantially duplicates the key board of a standard typewriter and has a number of key levers not found on a standard typewriter key board. In perforating machines as heretofore constructed, the feeding of the sheet forward or through the machine is in most cases accomplished by the movement of the key lever downwardly during the punching operation. If the downward movement varies in different strokes, the spacing between the consecutively formed perforations likewise varies and in my perforating machine I have provided for a positive feed of the paper being perforated during the return movement of the key lever after the perforation is accomplished, thereby insuring substantially uniform spacing on the same portions of the stencil sheet and another object of the invention is to provide an improved perforating machine for preparing stencil sheets which control the operation of my typewriter attachment.

In practice it is found that the standard circular apertures in the tracker bar provide sufficient control to actuate the various parts and movable elements of the typewriter as desired, except in certain cases, such for example, as that of the actuation of the tabulation key and in other cases where the primary valve controlling the power pneumatic should be subject to atmospheric pressure for a relatively long period. In such cases the longer period of exposure to atmospheric pressure may be obtained by having the corresponding stencil sheet perforation in register with the proper tracker bar aperture for a longer period than is provided by a circular aperture. This requirement may be met by providing a slotted or elongated tracker bar aperture, but it is found in practice that the portions of the stencil sheet adjacent the perforations which register with such slotted apertures are drawn or sucked slightly into the slot and are thereby caused to wear unduly adjacent such perforations. Another object of the invention is to provide improved means for prolonging the register of a stencil sheet perforation with a tracker bar aperture whereby the described deleterious or abrading effects are eliminated.

Many other objects and advantages of the construction herein shown and described will be obvious to those skilled in the art from the disclosure herein given.

To this end my invention consists in the novel construction, arrangement and combination of parts herein shown and described and more particularly pointed out in the claims.

In the drawings, wherein like reference characters indicate like or corresponding parts:

Fig. 6 is a sectional view along the line 6—6 of Fig. 5;

Fig. 7 is a view along the line 7—7 of Fig. 5;

Fig. 8 is a view along the line 8—8 of Fig. 1;

Fig. 9 is a view along the line 9—9 of Fig. 8;

Fig. 10 is a sectional view along the line 10—10 of Fig. 9

Fig. 11 is a view along the line 11—11 of Fig. 1;

Fig. 12 is a plan view of the rewind and permanent stop block drawn to a larger scale;

Fig. 13 is an inverted plan view of the rewind and permanent stop block shown in Fig. 12;

Fig. 14 is a sectional view along the line 14—14 of Fig. 12;

Fig. 15 is a plan view of the control action forming a portion of the attachment, said view being taken along the line 15—15 of Fig. 7;

Fig. 16 is an elevational view of the control action show in Fig. 15;

Fig. 17 is a sectional view along the line 17—17 of Fig. 15;

Fig. 18 is a plan and partial sectional view along the line 18—18 of Fig. 5;

Fig. 19 is an elevational view of the pneumatic action shown in Fig. 18;

Fig. 20 is a sectional view along the line 20—20 of Fig. 19;

Fig. 21 is a section along the line 21—21 of Fig. 1;

Fig. 25 is a plan view of an alternative embodiment of my invention comprising two sets of tracker bars and master sheets, one of which is adapted for controlling the writing of the body of a letter and the other for the salutation and inserts, or the like;

Fig. 26 is a view along the line 26—26 of Fig. 25;

Fig. 27 is a view along the line 27—27 of Fig. 25;

Fig. 31 is a plan view of a manually operable machine through which a sheet of paper is adapted to be fed and perforated as a master letter or stencil sheet;

Fig. 32 is a front elevational view of the machine shown in Fig. 31;

Fig. 33 is a side elevational view of the perforating machine shown in Figs. 30, 31, and 32;

Fig. 34 is a section along the line 34—34 of Fig. 32;

Figs. 35 and 36 are detail views of the connecting rods between the power pneumatics and the key levers of the typewriter;

Fig. 37 is a detailed perspective view of a portion of the device shown in Fig. 22; and Fig. 38 is a view along the line 38—38 of Fig. 11.

Figure 1:
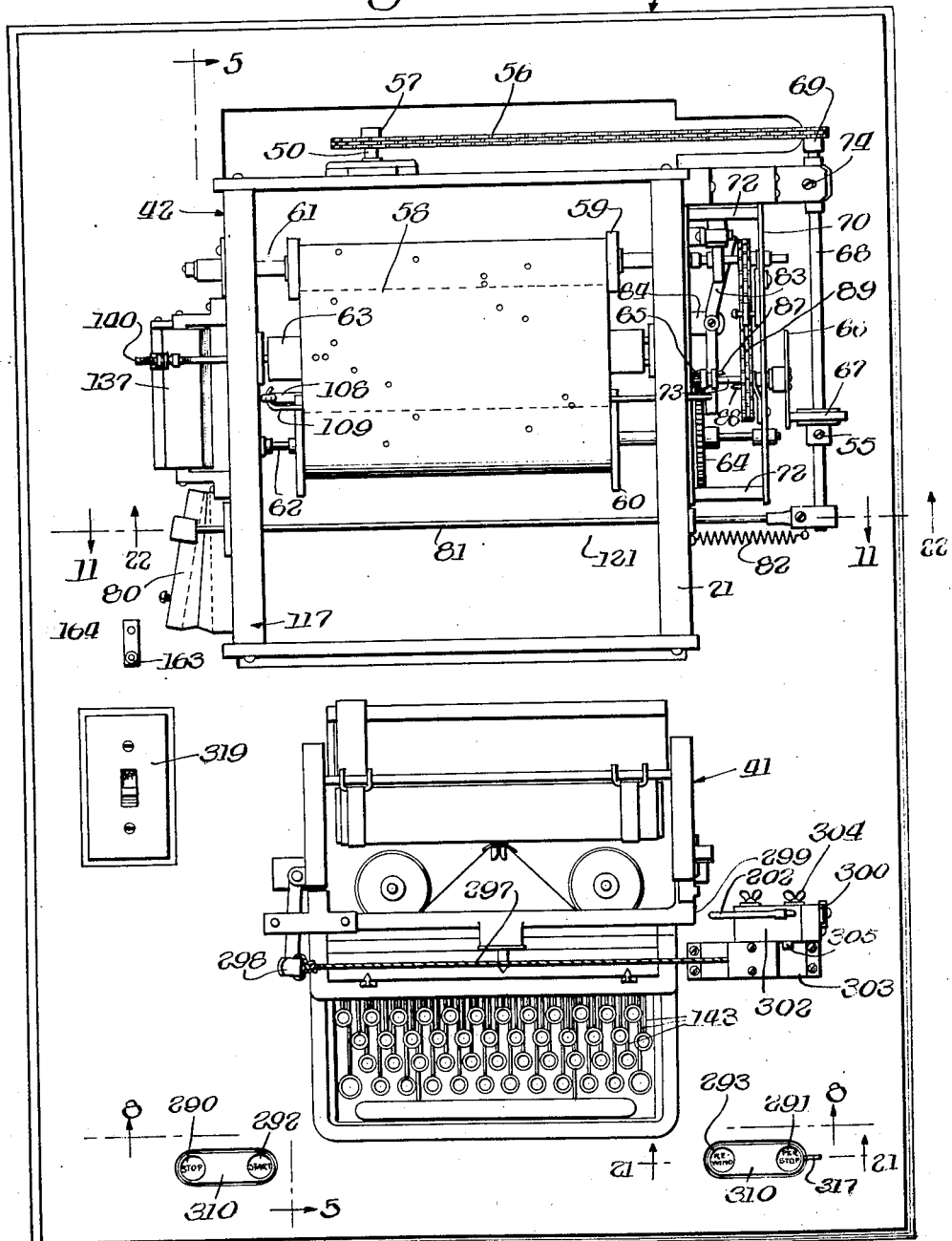
Fig. 1 is a plan view of my device showing a standard make of typewriter in position and connected therewith.

Referring now to the drawings, 40 represents a desk or cabinet on which a typewriter generally designated by the reference character 41 is mounted in close proximity to the device or attachment comprising my invention, the device being generally designated by the numeral 42. Power for operating the attachment is furnished by a motor 43 which is mounted underneath and supported by the cabinet 40 as best shown in Fig. 6.

The motor 43 is connected by means of a driving belt 44 with the outer periphery of a pitman or drive wheel 45. For the purpose of keeping the belt 44 taut and to minimize the vibratory noises of the motor, I have provided a specially constructed motor support comprising a plurality of spiral springs 46 positioned between the base of the motor 43 and a supporting block 47. The block 47 is connected at one end to a relatively thin plate 48, the block and plate thereby providing a yielding support in the nature of a cantilever. The resiliency of the springs 46 combined with the resiliency of the plate 48 causes the motor 43 to be partially supported by the belt 44. The belt 44 is thereby stretched sufficiently taut that no slipping occurs and compensates for such irregularities as may exist in the periphery of the drive wheel 45, whereby the motor runs smoothly and substantially noiselessly.

A framework 49 provides a support for the pitman or drive wheel 45 and for a shaft 50 on which the wheel 45 is mounted. A main drive chain 56 operatively connects the drive wheel with the actuating mechanism of a stencil sheet 58 through the medium of a sprocket wheel 57 which is mounted on the shaft 50.

The stencil sheet or master letter 58 comprises a sheet of paper which has been perforated and wound upon a carrying or delivery spool 59. The spool 59 is fixedly mounted upon a shaft 61 which is positioned on one side of a tracker bar 63. The free end of the stencil sheet 41 is connected with a take up or winding spool 60 which is positioned on the opposite side of the tracker bar 63 from the spool 59. The winding spool 60 is fixedly mounted upon a rotatable shaft 62. The shafts 61 and 62 are separately rotated by a system of gears, pinions, clutches, etc., comprising a wind and a rewind mechanism which is connected with a friction drive. The friction drive is operatively connected with the main drive chain 56. The wind and rewind mechanism is intermittently operable to wind and unwind the stencil sheet 58 on the spools 59 and 60, such operations carrying the sheet back and forth over the tracker bar 63. The mechanism is operable to feed the sheet 58 back and forth over the tracker bar 63 without reversing the direction of travel of the chain drive 56.

The winding and rewinding mechanism includes a shaft 68 having a sprocket wheel 69 fixedly mounted on one end, the shaft being rotated by the main drive chain 56 through the medium of the sprocket wheel. A friction wheel 67 is mounted on the shaft 68 in such position as to be movable into and out of operative contact with a disk 66. The wheel 67 is slidable along the shaft 68 to vary the rate of rotation of the disc 66 for a given rate of rotation of the shaft 68. The wheel is fastened in its adjusted position by a set screw 55.

A horizontal bar 70 and a side wall member 71 which are separated by spacers 72 provide a support for the wind and rewind mechanism including a shaft 73 upon which the disk 66 is mounted. A pinion 65 is suitably mounted upon the shaft 73 to engage a gear 64. The gear 64 is fixedly mounted upon the shaft 62 whereby the chain 56 rotates the shaft 62 and the take up spool 60 to wind the stencil sheet 58 upon the spool. The shaft 68 is provided with a swing bearing 74 which permits the shaft to be moved to a position disengaging the friction wheel 67 from the disk 66 when it is desired to stop the wind and rewind mechanism while the motor 43 is running.

A start and stop pneumatic 80 is operatively connected with the free end of the shaft 68 by a rod 81 whereby collapse of the pneumatic moves the friction wheel 67, against the pull of a tensile spring 82, out of engagement with the disk 66 thereby stopping movement of the wind and the rewind mechanism. Expansion of the pneumatic 80 similarly operates to move the rod 81 to bring the friction wheel 67 again into engagement with the disk 66. The tensile spring 82 assists in moving the pneumatic 80 back to expanded condition and in holding the wheel 67 in operative engagement with the disk 66.

Provision is made for automatically rewinding the stencil sheet 58 upon the delivery spool 59 when the sheet has been completely advanced over the tracker bar 63 by providing a suitable stencil sheet perforation. The rewinding operation may also be started at any time by punching a rewind button as hereinafter described. This rewinding operation is accomplished by mechanism which is operatively connected with the shaft 73 whereby rotation of the shaft in the same direction as for actuating the wind mechanism will actuate the rewind mechanism. For this purpose, the pinion 65 is slidably mounted upon the shaft 73 so as to be moved out of engagement with the gear 64. A lever 83 which is pivotally mounted upon a bracket 84 as shown in Fig. 1, is operatively connected with a rewind pneumatic 85 shown in Fig. 3. Collapse of the pneumatic 85 moves the lever 83 to shift the pinion 65 out of engagement with the gear 64 and into engagement with a sprocket wheel, through the operation of a bell crank lever 104, which operation is hereinafter described in detail. The pinion 65 is keyed to the shaft 73 so as to rotate therewith and upon disengagement of the pinion and the gear 64, rotation of the take up spool 60 and advance of the stencil sheet 58 over the tracker bar ceases.

A pair of pointed pins 87 and 88 are suitably mounted upon the pinion 65 and the sprocket wheel 86, respectively. The sprocket wheel 86 is rotatable on the shaft 73 and the pins 87 and 88 are brought into engagement by shifting the pinion 65, whereby rotation of the pinion with the shaft 73 rotates the sprocket wheel 86.

A chain belt 89 connects the sprocket wheel 86 with a sprocket wheel 90 which is fixedly mounted upon the shaft 61. The carrying or delivery spool 59 is thereby rotated to rewind the stencil sheet 58 on the spool 59 and to unwind the sheet from the take up or winding spool 60. When the rewinding of the sheet 58 upon the delivery spool 59 is completed, the lever 83 is shifted by the bell crank lever 104 to slide the pinion 65 out of engagement with the sprocket wheel 86, thereby stopping the rewinding mechanism, and into a position where it again engages with the gear 64, thereby again starting the winding mechanism, the sheet 58 being thereby again advanced over the tracker bar 42.

Figure 3:
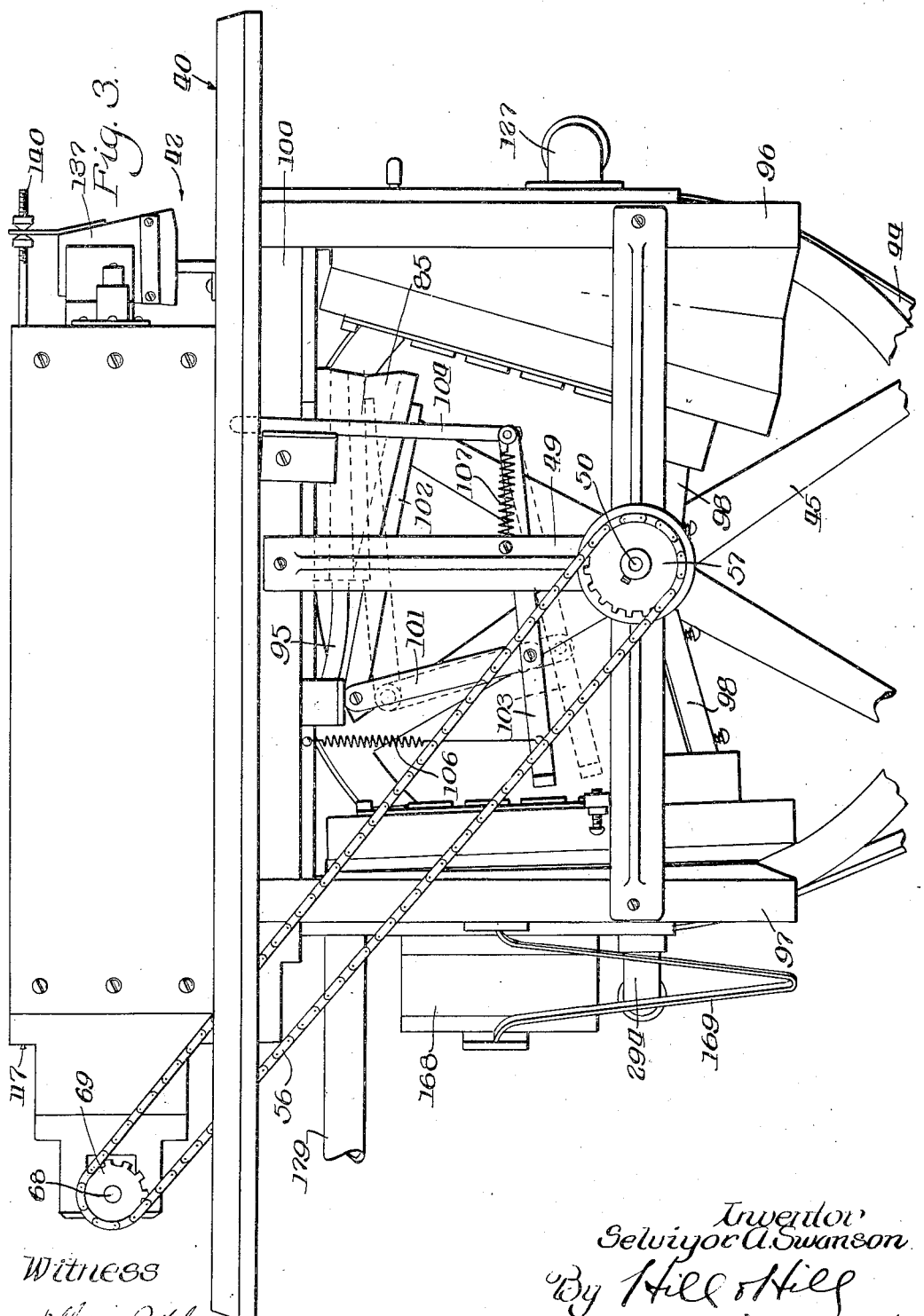
Fig. 3 is a rear elevational view showing the vacuum pump pneumatics and a pitman or drive wheel which is operatively connected therewith.

The rewinding pneumatic 85 is mounted as shown in Fig. 3 on the underside of the cabinet 40 and is connected by a tube 95, through a control action 181, with a system of conduits in which reduced air is maintained by the rotation of the drive wheel 45. The drive wheel 45 is connected with a pair of pump pneumatics 96 and 97 by pitman rods 98. The pitman rods 98 are pivotally mounted at their adjacent ends upon a pitman pin 99 and are pivotally connected at their opposite ends to the pump pneumatics 96 and 97. Rotation of the wheel 45 alternately expands and collapses the pneumatics 96 and 97, as best shown in Fig. 6, whereby air is pumped from a conduit 100 with which the pump pneumatics are connected thereby maintaining less than atmospheric pressure or so-called reduced or rarefied air in the conduit. The rewinding pneumatic 85 collapses upon the completion of the unwinding of the stencil sheet 58 from the delivery spool 59 by reason of the registering of a particular tracker bar aperture with a perforation in the sheet 58. The particular tracker bar aperture is connected through a primary valve 204 in the control action 181 to cause collapse of the pneumatic 85 when that particular tracker bar aperture is unsealed.

A system of bars and levers connects the rewinding pneumatic 85 with the lever 83 which has been described as operating to throw the pinion 65 out of engagement with the winding mechanism and into engagement with the rewinding mechanism and vice versa. A link 101 pivotally connects an arm 102 with a bar 103 as best shown in Fig. 3. The full line position of the link 101, the arm 102 and the bar 103 indicate the position which these members take when the pneumatic 85 is expanded and the dotted lines indicate the position these elements take when the pneumatic 85 is collapsed. In the collapsed position of the pneumatic 85, the bar 103 has been pushed downwardly into a position wherein the pump pneumatic 97 in expanding will strike the free end of the bar. The opposite end of the bar 103 is pivotally connected with a rod turned to form a double bell crank lever 104. The lower end of the lever 104 is connected to the bar 103 and extends in a generally vertical direction up to the top of the cabinet 40 where it occupies a generally horizontal position and projects through a mounting member or block 105 as is best shown in Fig. 11. When the bar 103 is in the dotted line position corresponding to the collapse of the pneumatic 85, expansion of the pump pneumatic 97 results in its striking and moving the bar 103 longitudinally to the right as observed in Fig. 3 and thereby rotating the lever 104 about its bearing in the member 105. The upper free end of the lever 104 extends upwardly from its mounting in the member 105, the upturned free end being shown in dotted lines in Fig. 22 and more clearly shown in Figs. 11 and 37. A spring 106 tends to hold the bar 103 in its upper full line position and a spring 107 likewise tends to hold the lever 104 in its full line position as shown in Fig. 3 and to return the lever to its full line position when the pneumatic 97, by reason of its collapse, is disengaged from the end of the bar 103.

Figure 2:
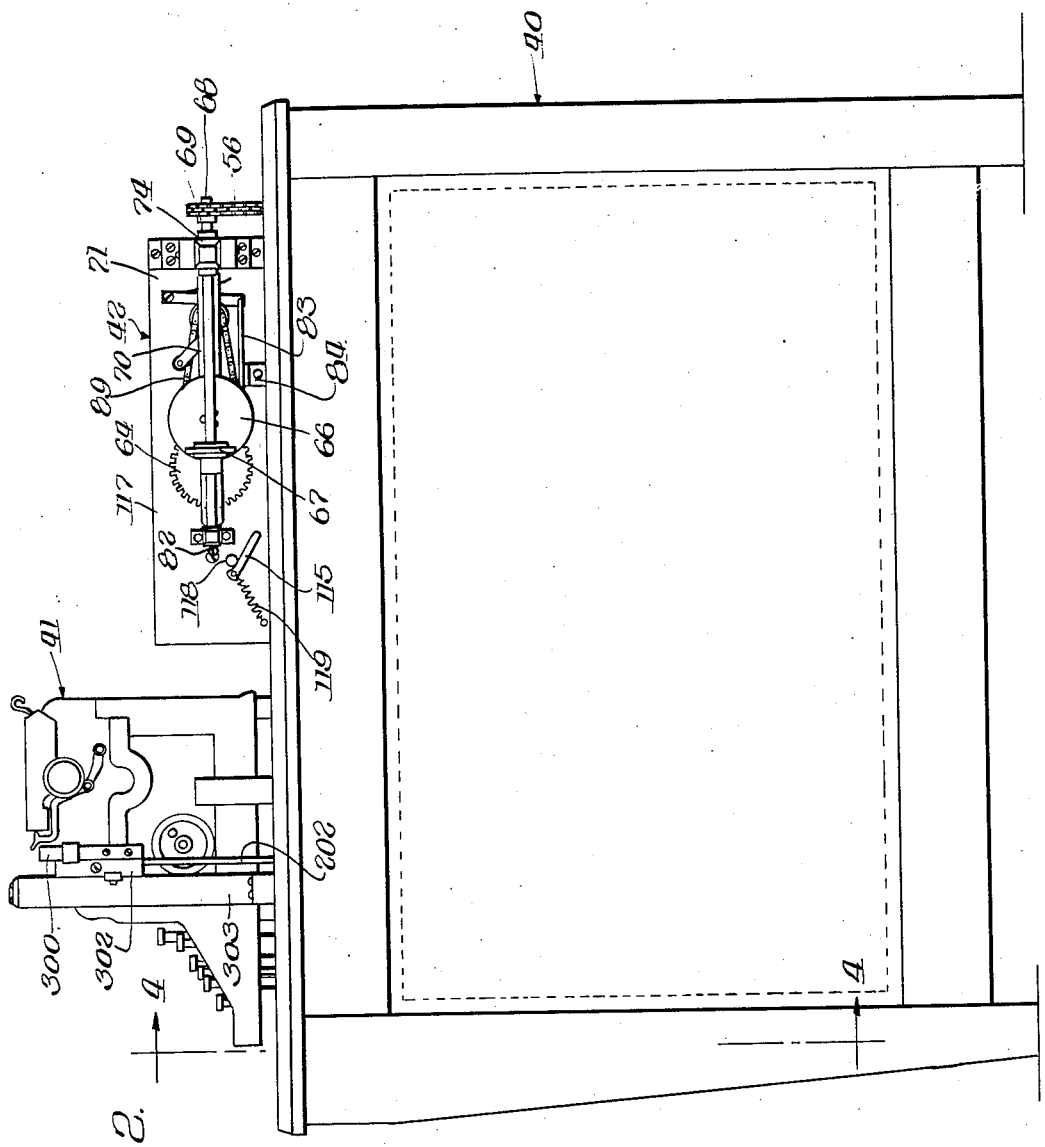
Fig. 2 is a side elevation of the cabinet in which the attachment is mounted and showing a portion thereof projecting above the top of the cabinet.
Figure 22:
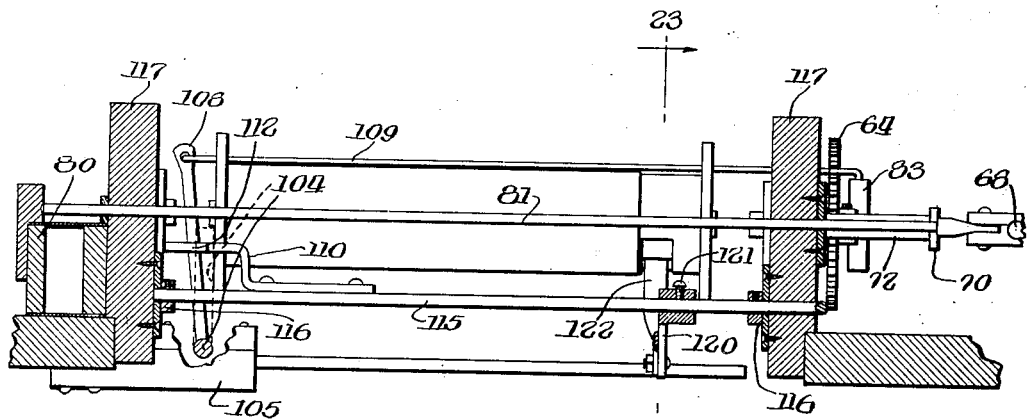
Fig. 22 is a section along the line 22—22 of Fig. 1.

A rewind thrust arm 108 projects upwardly from the horizontal portion of the lever 104 as best shown in Fig. 22, the free end of the arm being operatively connected with one end of a horizontally extending rod 109. The other end of the rod 109 is operatively connected with the clutch lever 83 as best shown in Figs. 1 and 22. It is obvious that the rotation of the lever 104, which is occasioned by the engagement of the expanding pump pneumatic 97, with the end of the bar 103 serves to rotate the horizontal portion of the lever 104 in counter-clockwise direction as observed in Figs. 3 and 11 and in clockwise direction as observed in Fig. 22. Rotation of the rod 104 causes a corresponding rotation of the thrust arm 108 and actuates the longitudinal rod 109 to throw the lever 83 to the position where the pinion 65 is disengaged from the gear 64 and into engagement with the rewinding mechanism whereby the rewinding mechanism is actuated to rewind the stencil sheet 58 upon the delivery roll 59. The rotation of the lever 104 which results from engagement of the pump pneumatic 97 with the adjacent end of the bar 103 moves its upper free end along the adjacent edge of a Z-shaped bar 110 with which the lever 104 is in contact. The upper portion of the Z-bar 110 is offset as best shown in Fig. 37, to form a shouldered recess 111 into which the lever 104 enters upon passing the shoulder 112. The bar 110 is fastened to a rod 115, which is rotatably mounted in bearings 116, provided for that purpose on the frame members 117. The rod 115 projects through the right hand member 117 as observed in Fig. 22 and is turned upwardly as best shown in Fig. 2. A pin 118 projects from the member 117 and provides a stop limiting the rotation of the rod 115. A spring 119 tends to rotate or pull the rod 115 towards the observer as viewed in Fig. 22, thereby keeping the bar 110 bearing against the free vertical portion of the lever 104 as shown in dotted lines in Fig. 22 and in perspective in Fig. 37. As a result of the pull of the spring 119 on the rod 115 the bar 110 presses against the lever 104 causing the bar to move to hold the lever in the recess 111. The spring 107 tends to cause the lever 104 to return to its starting point when the pump pneumatic 97 collapses, but such return is prevented by the contact of the lever with the shoulder 112.

Figure 23:
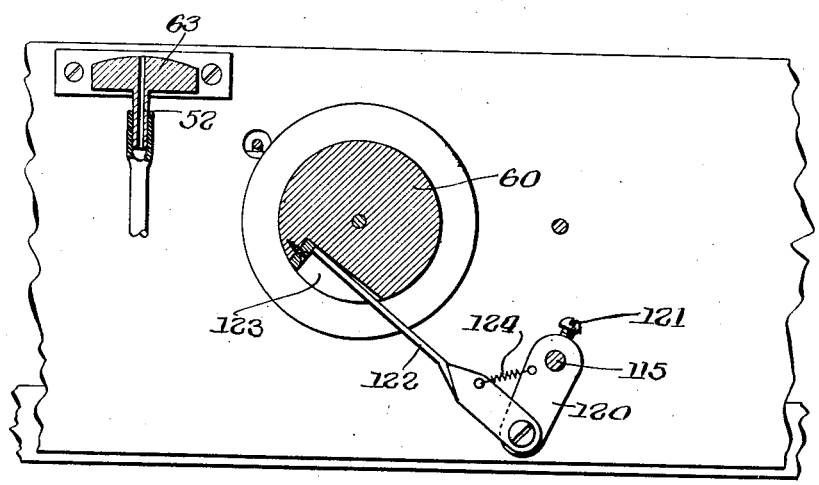
Fig. 23 is a view along the line 23—23 of Fig. 22.

The lever 104 is held in the recess 111 until the stencil sheet 53 is rewound upon the spool 59. Upon the completion of the rewinding movement the lever 104 is released from the recess 111 and is returned to its full line position of Fig. 3 by the pull of the spring 107 on the lower end of the lever. Release of the lever 104 is accomplished by providing an arm 120 which is fixedly mounted upon the rod 115 by means of a set screw 121 as shown in Fig. 23. A finger or detent bar 122 is pivotally mounted upon the arm 120 in position to engage the take up spool 60 when the stencil sheet 58 has been substantially unwound therefrom. For this purpose the roll 60 is provided with a recess 123 into which the free end of the detent bar 122 is pulled by the tension of a spring 124. The recess 123 is normally covered by the stencil sheet 58 which is wound upon the spool 60 and prevents the bar 122 from entering the recess except near the end of the sheet, where the sheet for that purpose is cut away at one edge to uncover the portion of the spool containing the recess. By this arrangement the member 122 is permitted to drop into the recess 123 only when the sheet 58 is substantially unwound from the spool 60. During the rewinding operation the spool 60 is rotating in counter-clockwise direction as observed in Fig. 23 and the detent bar 22 suddenly enters the recess 123 substantially at the end of the rewinding operation. The momentum of the spool 60 at the time the bar 122 enters the recess 123 is sufficient that contact of radial wall of the recess with the end of the bar serves to take up the slack in the sheet 58 occasioned by the rewinding of the sheet upon the carrying spool 59, and also moves the arm 120 and the rod 115 a partial rotation in counter-clockwise direction as observed in Fig. 23. The rotation of the rod 115, which is caused by the kick of the detent member 122, carries with it the bar 110 and rotates the bar out of engagement with the vertically extending free end of the lever 104, whereby the lever is free to rotate back to its original position under the pull of the spring 107 upon the lower end of the bar 104. Thus it is seen that collapse of the pneumatic 85 rotates the free end of the lever 104 along the edge of the bar 110 where the lever is locked in the recess 111. During the rewinding operation and upon the completion of the rewinding operation the lever 104 is permitted to return to the position it occupied before the pneumatic 85 was collapsed.

Figure 5:
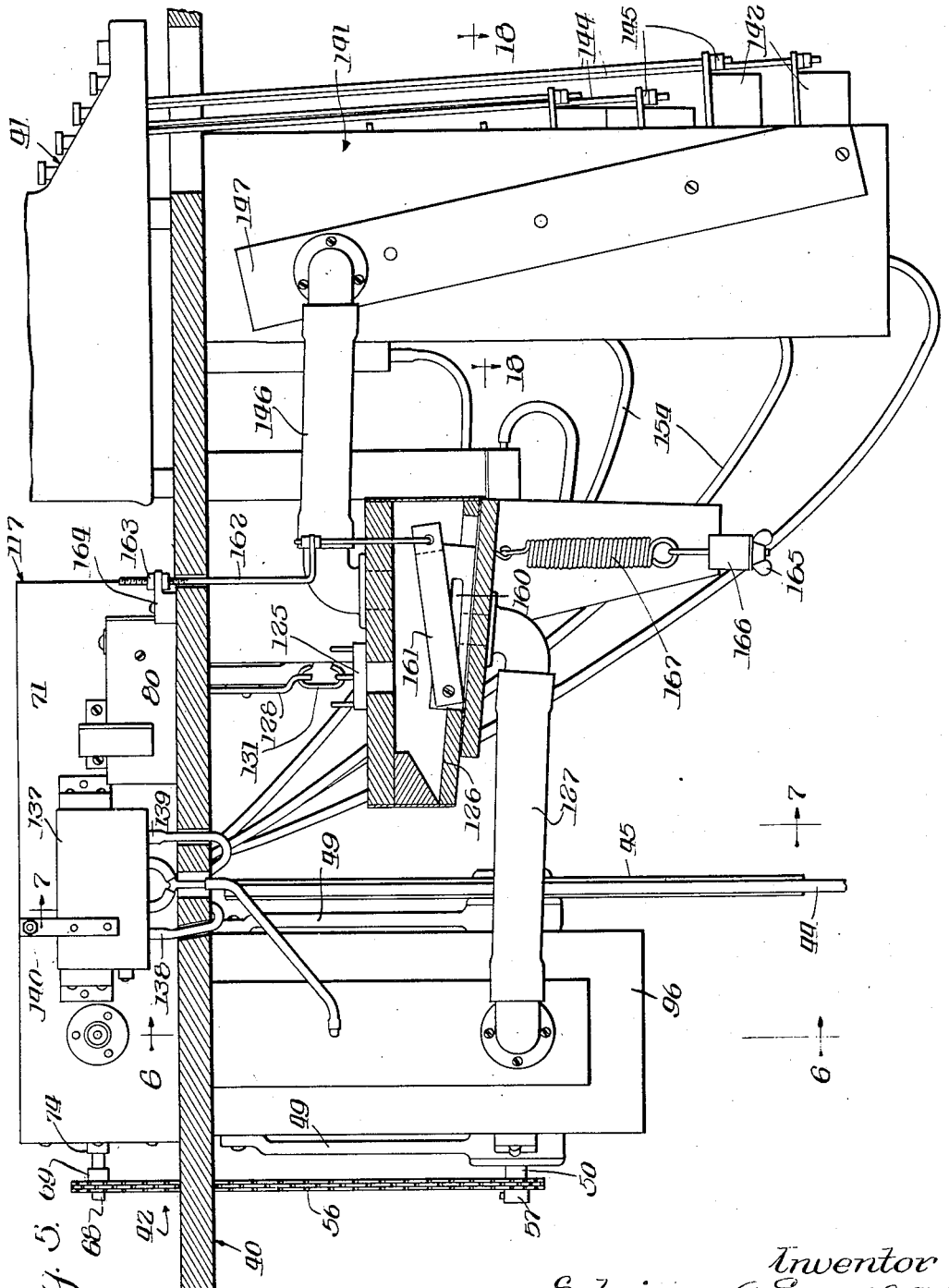
Fig. 5 is a longitudinal sectional view along the line 5—5 of Fig. 1.

The movement of the upper free end of the lever 104 which is occasioned by the collapse of the pneumatic 85 and is described as being moved to the right as observed in Fig. 22, and as to the left as observed in Fig. 11, is utilized to open the conduit 100 to atmospheric pressure during the rewinding operation, thereby preventing an excess of power being exerted in reducing air pressure when no reduction is needed. For this purpose, I have provided a valve 125 in the top of the equalizer and safety governor pneumatic 126. The pneumatic 126 is directly connected with the conduit system 100 by a tube 127, whereby when the valve 125 is open the pump pneumatics 96 and 97 are not doing work in reducing air pressure in the conduit system. The valve 125 remains closed except during the rewinding operation and is opened during such operation by a lever 128 which is pivotally mounted on a block 129 as shown in Fig. 11. The upper end of the lever 128 has a transversely extending pin 130 with which the upper free end of the lever 104 engages. Movement of the lever 104 to the left, as observed in Fig. 11, is occasioned as hereinbefore described by the collapse of the pneumatic 85 and carries with it the upper end of the lever 128, thereby tipping the lever 128 about its pivotal mounting and lifting its lower end. The valve 125 is connected with the lower end of the lever 128 by link 131, as best shown in Fig. 5, and as a result the tilting movement of the lever 128 opens the valve 125, the valve remaining open only so long as the lever 104 remains in its position corresponding to the rewinding operation. Since the rewind thrust arm 108 is moved to disconnect the rewinding mechanism and to connect the winding mechanism with the pinion 65 upon the completion of the rewinding operation, it follows that the valve 125 opens simultaneously with the engagement of the rewinding mechanism and closes simultaneously with the engagement of the winding mechanism with the pinion, whereby the starting and stopping of the rewinding mechanism is synchronized with the opening and the closing of the valve 125.

The tracker bar 63 is provided with a plurality of apertures the greater number of which are preferably circular in cross section. The apertures are so positioned as to be sealed by the master letter or stencil sheet 58, except when a perforation in the sheet registers with an aperture as it is advanced over the tracker bar in unwinding the sheet from the carrying spool 59 and winding it upon the take up spool 60. Each of the perforations in the stencil sheet 58 is positioned so as to be moved over one of the tracker bar apertures, and as the sheet 58 advances each perforation in turn passes over and unseals one of the apertures in the tracker bar. Proper registering of the stencil sheet perforations with the tracker bar apertures requires that the stencil sheet be kept in true alignment with the tracker bar and for this purpose I have provided a device which automatically shifts the tracker bar 63 laterally relative to the stencil sheet 58 whenever the latter is out of its proper position. This correction is accomplished by providing an aperture in each end of the tracker bar immediately adjacent the edges of the sheet 58 and sealed thereby when the sheet is in true alignment. These apertures are connected with a compound pneumatic 137 through pneumatic tubes 138 and 139.

The pneumatic 137 is connected with the tracker bar 63 by a rod 140 whereby when one section of the pneumatic collapses the rod 140 is shifted to the right as observed in Figure 7, and when the other section of the pneumatic collapses the tracker bar is shifted to the left. If, for example, the stencil sheet 58 is misplaced sufficiently to partially uncover the aperture in the tracker bar with which the tube 139 is connected the right hand section of the pneumatic 137 will collapse and force the tracker bar to the left sufficiently to seal the aperture. In the event the aperture connected with the tube 138 is uncovered, the left hand section of the pneumatic 137 with which the tube is connected will collapse and thereby move the tracker bar to the right sufficiently to cover the aperture with which the tube 138 is connected. This movement will be repeated at any time the sheet 58 gets out of alignment and automatically results in keeping the tracker bar sheet 58 in alignment. A more detailed description of the mounting of the pneumatic 137 is omitted since this feature forms no part of the invention.

Figure 4:
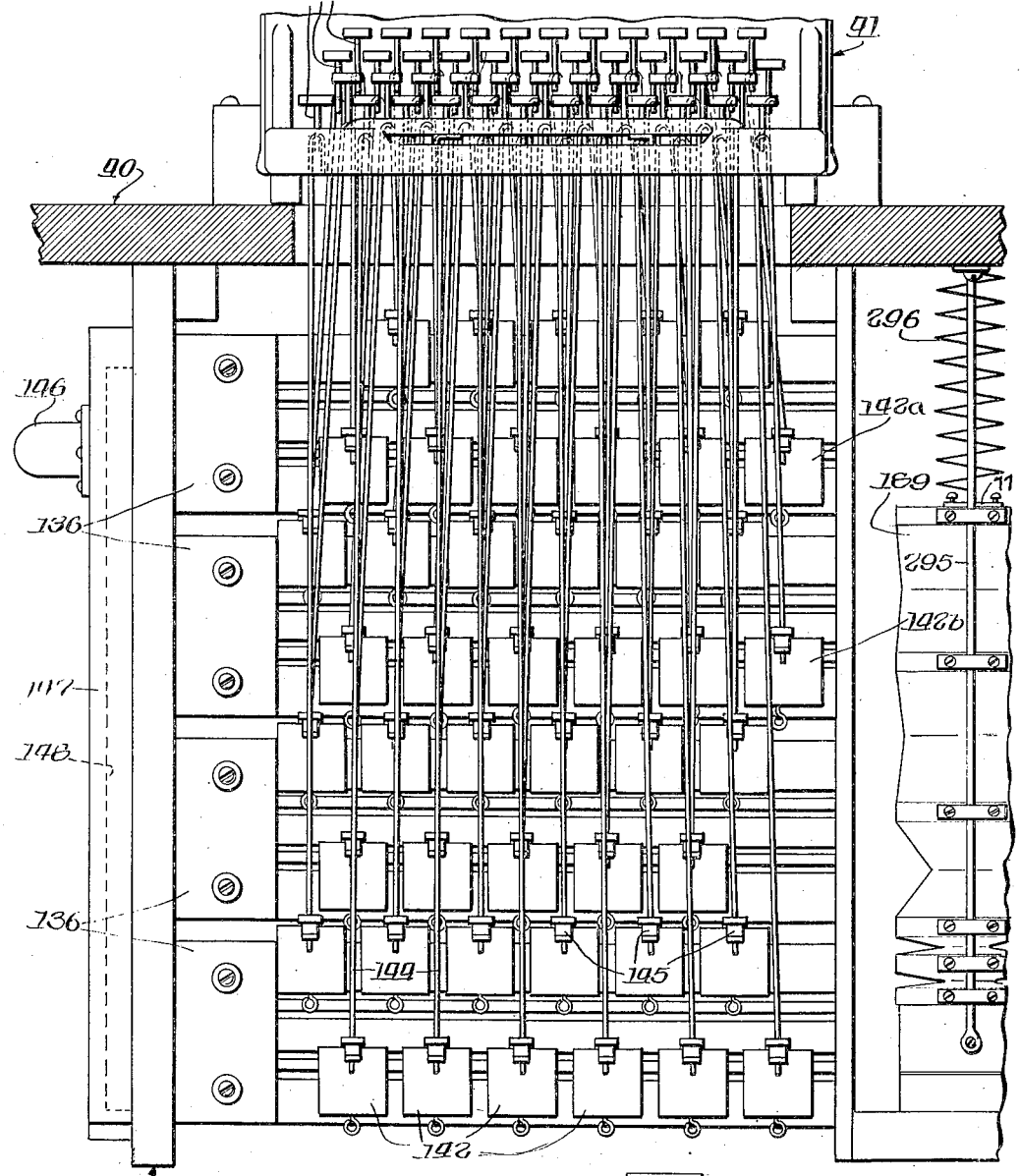
Fig. 4 is a front elevational and sectional view along the line 4—4 of Fig. 2 showing the individual power pneumatics which actuate the various keys or other movable instrumentalities of a typewriter, together with a pneumatic of novel construction which actuates the carriage and line shift of the typewriter.

All the movable parts of the attachment are pneumatically actuated except the wind and rewind mechanism which are power driven and adapted to be alternately connected and disconnected with a chain drive 56 as previously described. Sufficient reduction of air pressure to supply power for pneumatically actuating the various other movable parts of the attachment is secured by the operation of the pneumatic pumps 96 and 97 as previously described. The conduit 100 with which the pumps 96 and 97 are connected forms a part of a system of conduits connecting the pumps with various individual pneumatics and with a plurality of power pneumatics 142 hereinafter designated as the pneumatic action 141. The pneumatic action 141 comprises four banks or sections 136 of relatively small power pneumatics 142. Fig. 4 shows the front elevational view of the pneumatic action 141, while Fig. 7 shows the rear view thereof. The pneumatics 142 are each separably connected with a typewriter key lever 143 by a wire or rod 144. The rods 144 are bent over at their upper ends to form hooks adapted to engage a key lever on the typewriter with which the attachment is thereby connected. The lower ends of the rods 144 are each adjustably connected to one of the power pneumatics 142, by means of nuts 145. The rods 144 extend through holes 75 in bars 76 with the nuts 145 normally engaging the bars. The holes 75 are larger than the rods 144 and permit the rods to slide through the holes in the event the typewriter key levers do not retract as rapidly as the pneumatic expands. This slidable connection of the rods 144 at their lower ends and their hooked connection at their upper ends enable the key levers to be manually actuated when the attachment is not operating.

Collapse of a power pneumatic 142 actuates the key lever of the typewriter downwardly in the same way as when operated manually. In the event that a key lever which has been moved downwardly by the collapse of a pneumatic 142 fails to return to its normal inoperative position such failure will not prevent the expansion of the pneumatic since the upper hooked ends of the rod 140 will slide over the key lever. The connection of the rods 144 to the key levers 143 of the typewriter is the only direct connection of the attachment 42 with the typewriter 43. No drilling of holes or other physical changes in the typewriter are required, the operative connection of the attachment being accomplished by merely hooking the rods 144 over the key levers 143.

The pneumatic action 141 is connected with the pump pneumatics 96 and 97 through the tube 146, the equalizer or safety governor pneumatic 126, the tube 127 and the conduit system 100. A U-shaped member 147 forms a lead 148 from which a passage 149 opens into each of the sections or banks 136. The tube 146 opens directly into the lead 148 whereby each of the passages 149 of the separate sections or banks 136 is connected up with the conduit 100.

Each of the sections 136 have two rows of the power pneumatics 142 connected therewith. The pneumatics 142 in the upper row of each bank 136 are positioned in a zig-zag relation with or intermediate the pneumatics forming the lower row for the purpose of utilizing the space most effectively. Each of the pneumatics 142 is normally under atmospheric pressure and is yieldingly held in expanded position by a spring 150. A duct 151 leads from the interior of each of the pneumatics 142 to the adjacent passage 149. The passages 149 are preferably maintained at uniform reduced air pressure of from three to five pounds below atmospheric, while the interior of the pneumatics 142 are at atmospheric pressure when in their expanded position. The difference in pressure between the passages 149 and the ducts 151, which normally have the same pressure as that of the interior of the pneumatics 142, is maintained by a control valve 152 which is shown in seated position in Fig. 20.

Each of the valves 152 connects with a duct 153 which in turn is connected by a separate tube 154 with an aperture in the tracker bar 63. A relatively small bleeder valve 155 connects the duct 153 with the passage 149 and thereby serves to normally maintain the same pressure in the duct 153 and the tube 154 that exists in the passage 149. It is obvious that this reduced pressure in the duct 153 and the tube 154 can be maintained only when the aperture in the tracker bar 63, with which the particular tube 154 is connected, is covered or sealed by the stencil sheet 58. When a perforation in the sheet 58 registers with the aperture in the tracker bar 63, the air enters the tube 154 and the duct 153 and forces a diaphragm 156 against and unseats the valve 152. The unseating of the valve 152 connects the interior of the pneumatic 142 with the passage 149 and creates the same pressure in the pneumatic as exists in the passage 149. Since the reduced pressure in the pneumatic 142 represents a pressure of from three to five pounds below that of atmospheric pressure and since this pressure in the pneumatic is reduced instantaneously the pressure of the surrounding atmosphere instantly collapses the pneumatic 142. The collapse of the pneumatic 142 carries down with it the wire or rod 144, and with the wire or rod the particular key lever 143 with which the pneumatic is connected. The spring 150 immediately expands the collapsed pneumatic 142. The atmospheric pressure in the expanded pneumatic 142 then forces the valve 152 back to its seated position. The bleeder valve 155 then functions to create the same reduced pressure in the duct 153 and in the tube 154 as exists in the passage 149.

Figure 24:
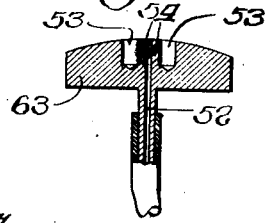
Fig. 24 is a section through a tracker bar illustrating a special form of aperture which functions similarly to an elongated aperture.

In Fig. 23, I have shown a cross section through the tracker bar 63, the section being taken through a circular aperture. In Fig. 24, I have shown a cross section through a special three way tracker bar aperture which functions similarly to an elongated aperture or slot which it has been the practice to provide when it is desired that there be a relatively prolonged admission of air through the unsealed tracker bar aperture. Such prolonged admission of air is desirable when the power pneumatic should remain collapsed for more than an instant, as for example, in the actuation of the typewriter tabulation key. The slotted aperture which it is the practice to provide for such purposes cause an unduly rapid abrasion and wearing of the stencil sheet adjacent the perforations which register with the slotted hole, for the reason that the suction draws the paper into the slot slightly and brings it into contact with the sharp edges of the aperture. The three way aperture shown in Fig. 24 prevents such undue wear and abrasion of the sheets since the material between the apertures forms bridges which minimize the cupping of the sheets. This construction includes a standard full depth aperture 52 and adjacent secondary apertures 53, which are connected with the aperture 52 through passages 54. The spacing of the apertures 52 and 53 is less than the diameter of a stencil sheet perforation. A stencil sheet perforation, in passing over this special aperture, is constantly in register with one or the other of the apertures 52 or 53, thereby securing the desirable prolonged admission of air. Any number of secondary apertures 53 can be provided in accordance with the requirements of the pneumatic with which the special aperture is connected.

The equalizer and safety governor pneumatic 126 which connects the tubes 127 and 146 is provided with a control valve comprising a slot 160 through which the tube 127 connects with the interior of the pneumatic, and a pivotally mounted shutter 161 which is operable to open and close the slot. The control valve is provided for regulating the amount of reduced air available for the battery of power pneumatics 142. Since the power pneumatics 142 actuate the key levers of the typewriter, it is obvious that the greater the reduction of air pressure in the pneumatic action 141, the more intense will be the strike of the key levers 143 and the heavier the weight of the resulting automatic typing. By partially closing the shutter 161 the air pressure in the pneumatic action 141 is increased and by increasing the slot opening by opening the shutter 161, the air pressure in the pneumatic action 141 is diminished. This arrangement provides the necessary control whereby the weight of the automatically reproduced typing may be made to correspond in weight with the typing of the inserts and of the salutations manually produced by the operator of the machine.

The free end of the shutter 161 is suspended from a bracket 164 by a rod 162 which projects upwardly through the top of the cabinet 40. The projecting end of the rod 162 is threaded and provided with nuts 163, one above and one below the bracket 164. The position of the shutter 161 is adjusted to vary the opening of the slot 160 by threading the nuts 163 on or off the rod 162. A spring 167 connects the lower end of the pneumatic 126 with a shelf 166 which projects from the side of the cabinet 40. The spring 167 provides an additional control of the flow of reduced air by permitting a limited amount of relative movement of the upper and lower walls of the pneumatic 126. A thumb screw 165 is provided to regulate the tension of the spring 167.

Air is maintained at reduced pressure in conduit 100 by operation of the pump bellows 96 and 97 as hereinbefore described. The speed at which the motor 43 operates and the demands upon the pump bellows 96 and 97 varies in accordance with the reduction of pressure in the conduit 100 and for the purpose of keeping this pressure as nearly uniform as possible, I have provided an equalizer pneumatic 168 as shown in Figs. 3 and 6. A V-spring 169 normally prevents complete collapse of the pneumatic 168 but permits a billowing movement of the outer wall of the pneumatic in accordance with minor fluctuations of the pressure in the conduit 100, such inward and outward movement of the wall of the pneumatic serving to compensate for the minor pressure fluctuations in the conduit. If for any reason an excessive reduction of air pressure should occur in the conduit 100 and the pneumatic 168, an auxiliary valve 170 will come into operation and momentarily open the interior of the pneumatic and the conduit to atmospheric pressure. The valve 170 is held in seated position by means of the spring 172, and as a result the valve will not open until the difference in pressure between the atmosphere and the interior of the pneumatic 168 is sufficient to overcome the resistance of the spring.

The air pressure at which the pneumatic action should be maintained to produce the desired weight of typing is in general insufficient to actuate the shift lever of the typewriter which changes the typing from small to capital letters. For this purpose I have constructed a partition 176 in one of the passages 149, as shown in Fig. 19, and thereby provided a subsidiary conduit or chamber 177 for control of the power pneumatic 142b, which is connected with the capital shift lever. In order that the reservoir 177, which is thus separated from the passage 149, may have a lower air pressure than the passage, the reservoir is connected by a conduit or tube 178 with a tube 179 leading directly to the conduit system 100, adjacent the pump bellows 96 and 97. The conduit system 100 is maintained at a substantially lower air pressure than is the pneumatic action 141, and by reason of this connection with the conduit system, air at sufficient low pressure is constantly maintained in the reservoir 177 to properly actuate the cap shift lever of the typewriter. A small tube 180 connects the reservoir 177 with the particular tracker bar aperture with which a perforation in the stencil sheet 58 registers to correspond with the desired shift from small to cap letters and the other key levers are actuated by power pneumatics 142, controlled by air at a higher pressure than that which is maintained to control the operation of the cap shift lever of the typewriter.

Proper control of the action of the attachment 42 requires the performance of other operations than the direct actuation of the typewriter key levers. Included among these additional control operations are the control of the stop pneumatic, line shift or line spacing and carriage return pneumatic, the rewind pneumatic, etc. The tracker bar apertures which are not connected with the power pneumatics 142 are provided for the purpose of controlling the stop pneumatic, the rewind pneumatic, etc., and are connected with a control action 181, as is illustrated in Figs. 15, 16 and 17, by tubes leading from the tracker bar apertures to separate primary valves located in the control action. The control action 181 is a housing having a chamber 182 therein and a plurality of valves operatively connected with the chamber, said valves separably functioning as hereinafter described. Air at considerably reduced pressure is maintained in the chamber 182 by means of the tube 179 which directly connects the chamber with the conduit system 100 immediately adjacent the pump pneumatics 96 and 97. By reason of the size of the tube 179 and its direct connection with the pneumatic pumps 96 and 97, I am enabled to maintain air at a greater degree of rarefaction in the control action 181 than is found to be necessary in the pneumatic action 141.

The valves which are connected with the chamber 182 operate to supply air at atmospheric pressure to the secondary valves of the particular pneumatics with which the control action is connected. The tube 183 connects the tracker bar with the primary valve 184, thereby opening the valve to admit outside air to tube 185. The tube 185 is connected with the secondary valve of the power pneumatic 142a and thereby controls the shift from small letters to capitals.

A tube 186 connects the tracker bar 63 with the primary valve 187, and actuates the valve to admit outside air to a tube 188. The tube 188 controls the secondary valve of a carriage or accordion pneumatic 189. The pneumatic 189 is provided for the purpose of shifting the carriage of the typewriter as hereinafter more particularly described.

A primary valve 190 is connected with the tracker bar 63 by a tube 269 thereby providing for the admission of outside air to a tube 227 which leads to a selector pneumatic 226. A primary valve 192 connects the tracker bar tube 191 with a tube 193 which is connected with the secondary valve of the particular power pneumatic 142 which is connected with the spacer bar of the typewriter. A primary valve 195 connects the tracker bar tube 194 with a tube 196. The tube 196 operatively connects the primary valve 195 with the secondary valve of the power pneumatic 142b, which actuates the tabulator key of the typewriter.

A tube 197 leads to the tracker bar aperture which is subject to be controlled by a perforation in the stencil sheet intended to stop operation of the attachment. The stop tube 197 is connected with the tube 199 by a single valve 198. The valve 198, in the position shown in Fig. 17, places the tube 197 in direct connection with the tube 199. The tube 199 connects the valve 198 with a valve 200 which is located in the end of the control action. The valve 200 is directly connected with and controls the stop pneumatic 80 through the medium of a tube 201.

A tube 199a is connected with the tube 199. The tube 199a forms into branches 199b and 199c, the tube 199b being connected with a stop button 290 and the tube 199c being connected with a permanent stop button 291. A tube 202 leads from the valve 198 to a start button 292 whereby when the start button is punched to admit air to the tube 202 the valve 198 is raised to close the connection between the tube 197 and the tube 199.

The valve 204 connects the tracker bar tube 203 with the tube 95 which leads to the rewind pneumatic 85. A rewind button 293 is connected with the tube 203 by a tube 203a whereby when the operator punches the rewind button the collapse of the rewind pneumatic 85 follows in the same way as when the proper stencil sheet perforation registers with the tracker bar aperture which is connected to the tube 203.

The pneumatic 189 which is provided to actuate the line shift and to cause the return of the typewriter carriage, is an elongated pneumatic resembling an accordion and is positioned underneath the cabinet 40. A pair of guide rods 295 provide a vertical run-way for the movement of the pneumatic 189 in collapsing and expanding. The pneumatic 189 is lifted from its collapsed position by means of a weak spring 296 which affords slight or no resistance to the collapse of the pneumatic but has sufficient resiliency to elevate the pneumatic slowly as the typewriter carriage advances. The spring 296 thereby avoids placing any extra load or duty upon the typewriter or carriage spring and avoids the necessity for replacing the carriage spring with a stouter one. A valve 77 on top of the pneumatic 189 opens to permit the pneumatic to drop more quickly when the carriage is returned manually.

When the end of a line or the end of a paragraph is reached in the operation of the attachment, a pair of transversely aligned perforations in the control sheet 58 unseal corresponding apertures in the tracker bar 63. The tube 186 connects one of these apertures with the pneumatic 189 through the primary valve 187, thereby admitting outside air to the tube 188. The other exposed aperture of the tracker bar is connected with the stop pneumatic 80 so that the attachment stops operating during the return of the typewriter carriage.

The collapse of the pneumatic 189 results in the actuation of the typewriter line shift lever 298 and causes a return of the typewriter carriage 299. A pedestal 303 is positioned on the cabinet 40 adjacent the typewriter to provide a run-way and a support for a cord 297 which connects the top of the pneumatic 189 with the carriage 299 and line shift or line spacing lever 298 of the typewriter. The cord 297 extends upwardly from the top of the pneumatic 189 through a passage 307, formed in the pedestal 303, and over an idler pulley 306 which is mounted at the upper end of the pedestal in the passage 307. Collapse of the pneumatic 189 serves to pull the line shift 298 of the typewriter and the carriage 299 on which the line shift is mounted to the right, thereby simultaneously shifting the line and carriage.

Near the end of the return movement of the carriage 299 it strikes a flat spring 300 which is mounted in the path of the carriage. The spring 300 yields and opens a valve 301 thereby admitting air into a tube 202a. The tube 202a is connected with the tube 202, see F. G. 15, which controls the stop pneumatic 80 and by admitting air to the tube 202a the pneumatic expands and the stencil sheet 58 again starts moving.

The spring 300 is adjustably mounted on a block 302 by means of a set screw 304. The block 302 may be moved outward or inwardly thereby varying the position at which the typewriter carriage 299 will contact with the spring 300 and the pneumatic 80 be expanded and connect up the friction drive.

The stop and start buttons 290 and 292 are shown in Fig. 1 as mounted together and adjacent the left hand corner of the typewriter. The rewind button 293 and the permanent stop button 291 are similarly positioned adjacent the right hand corner of the typewriter. Each of the pairs of buttons are mounted on a block 310, the block being pivotally mounted, by means of a screw 311, upon a supporting block 312 which is fastened underneath the top cover of the cabinet 40. An aperture 315 is provided in the top of the cabinet 40 to provide room for oscillation or tilting of the block 310. The details of the mounting and the operation of the button 293 and 291 are shown in Figs. 12, 13, 14 and 21. The mounting of the buttons 290 and 292 is identical with that of the buttons 293 and 291 and the description of their mounting and actuation sufficiently describes the actuation of the buttons 293 and 291. A valve plate 313 is fastened to the block 312 by screws 316. By punching a button on either end of the block 310 the underlying spring 313 is pushed downwardly opening a valve 314 to uncover and admit atmosphere to the adjacent tube. If the operator desires to stop the machine temporarily, he pushes down on the button 290 thereby opening the duct 199a to atmosphere and causing the valve 200 to move to a position to open the tube 201 to reduced pressure with the resulting collapse of the stop pneumatic 80.

The attachment is started for all purposes by pushing down on the start button 292 thereby moving the corresponding valve 314 to open the tube 202 to atmosphere and actuating the valve 198 in the control action to shut off the connection of the tube 197 with the tube 199. Similarly by pressing down on the rewind button 293, the tube 203a which connects with the tube 203 is opened to atmosphere and the primary valve 204 in the control action is thereby operated to cause the collapse of the rewind pneumatic 85 with which the valve 204 is connected through the tube 95. The permanent stop button 291 is connected through the branch tube 199c with the valve 198 of the control action. By punching the permanent stop button 291 the same action results as followed the punching of the stop button 290. A hook 317 provides means for fastening the permanent stop button 291 in its depressed position. The hook 317 is pivotally mounted on a pin 318 and occupies the dotted line position of Fig. 21 when the button 291 is depressed with the hook engaging one edge of the button and serving to hold the button in its dotted line position as shown. Upon release of the hook 317, the button 291 takes the position shown in dotted lines in Fig. 21. A switch 319 is also shown positioned to the left of the typewriter for the purpose of turning on and off the motor 43.

The machine shown in the Figures 25 to 30 is controlled in its operation by two perforated stencil sheets 205 and 206, respectively. The stencil sheet 205 is perforated to provide control of the writing of the body of the letter, circular or other document and is hereinafter called the letter stencil sheet. The control sheet 206 is perforated to control the writing of the names and addresses, salutation and personal inserts corresponding to the persons to whom the writings are to be addressed, or it may carry any other special matter to be added to the common subject matter of the letters or circulars which are controlled by sheet 205. The sheet 206 is hereafter called the salutation stencil sheet. Each of the stencil sheets 205 and 206 cooperate with a tracker bar 63 when being unwound from a carrying roll 59 and wound upon a take up roll 60. The winding and rewinding mechanism of each of the sheets 205 and 206 are duplicates and similar to the winding and rewinding mechanisms of the single stencil sheet embodiment already described. The duplicate winding and rewinding mechanism is supported by a frame comprising a longitudinal bar 208 and a frame member 71 forming a part of the cabinet 40. The bar 208 is separated from the frame member 71 and supported therefrom by spacers 72. Each set of winding and rewinding mechanism thus supported by the frame work comprises a gear 64, a pinion 65, a lever 83, a supporting bracket 84, a sprocket wheel 86, pins 87 and 88 forming a pin clutch, and a chain belt 89. Shafts 210 and 211 provide mountings for the pinions 65 and the sprocket wheels 86 of the duplicate winding and rewinding mechanisms.

It will be understood that the stencil sheets 205 and 206 are not in operation nor being driven at the same time. The stencil sheet 206 controls the operation of the typewriter to address the letter, during which time the sheet 205 for writing the body of the letter is inoperative. The address sheet 206, having performed its function, stops operating while the sheet 205 operates to write the body of the letter or circular, after which the sheet 205 again becomes inoperative and if it is desired to insert further material personal to the recipient of the letter the stencil sheet 206 is again brought into operation according to the principles hereinafter explained. The attachment may be stopped entirely or both stencil sheets may cease operation and the typewriter be operated manually.

The power for actuating the master sheets 205 and 206 comes through the chain drive 56 and the sprocket wheel 69 in the same manner as for the single sheet mechanism. For this purpose the friction wheel 67 is mounted upon a shaft 207 the shaft having the sprocket wheel 69 fixedly mounted on one end. The other end of the shaft 207 is connected with a stop pneumatic 80 through the medium of a rod 223, whereby the friction wheel 67 is moved by the expansion and collapse of the pneumatic into and out of operative engagement with a friction disc 66. A stub shaft 209 is mounted upon the member 71 to provide a support for the friction disc 66, the disc being fixedly mounted upon the shaft to rotate therewith. Sprocket wheels 213 and 214 are both fixedly mounted upon the shaft 208 so as to rotate therewith. The shaft 210 has a sprocket wheel 215 slidably mounted thereon, and the shaft 211 also carries a slidably mounted sprocket wheel 216. The sprocket wheels 214 and 215 are connected by a chain drive 218 and the sprocket wheels 213 and 216 are similarly connected by a chain drive 217. It follows that the sprocket wheels 215 and 216 are continuously operated by the rotation of the shaft 209. Means are provided whereby one or the other of the continuously rotating sprocket wheels 215 and 216 actuates the shaft upon which it is mounted and only one of the shafts 210 and 211 are rotating at the same time, it being understood that such rotation occurs only when the shaft 207 is rotating and the wheel 67 is in contact with the disc 66.

In Fig. 25 the sprocket wheel 216 is shown in position to rotate the shaft 211 upon which it is mounted and thereby to actuate the winding mechanism to wind the salutation stencil sheet 206 upon its take up spool 60. Sprocket wheel 216 has for this purpose been shifted to a point where a pin 219 which is mounted upon the sprocket wheel contacts with a finger 220 mounted on the shaft 211. A pin 219 similarly mounted upon the sprocket wheel 215 is at the same time out of engagement with a corresponding finger 220 mounted upon the shaft 210, whereby the entire winding and rewinding mechanism controlling the letter stencil sheet 205 is out of operation.

A clutch lever 221, pivotally mounted upon a block 222 is operable to intermittently and alternately throw the respective sprocket wheels 216 and 215 into engagement with their adjacent fingers 220. Pneumatics 224 and 225 mounted at opposite ends of and immediately underneath the lever 221, provide means for oscillating or rotating the clutch lever 221 to move the sprocket wheels 216 and 215 into and out of engagement with their respective fingers 220. Each of the pneumatics 224 and 225 has a pin 51 so mounted thereon as to rotate the lever 221 when its pneumatic collapses.

In Fig. 25 the pneumatic 224 is shown as collapsed and the sprocket 216 in operative engagement with its finger 220. Collapse of the pneumatic 225 operates its pin 51 to move the lever 221 to a position where the sprocket wheel 216 is disengaged from its finger 220 and the sprocket wheel 215 is moved into operative engagement with its finger 220. The pneumatic 224 whose collapse operates to start the winding or rewinding mechanism of the salutation or insert sheets 206 will be hereinafter called the salutation pneumatic, and the pneumatic 225 whose collapse starts the operation of the winding or rewinding mechanism which moves the stencil sheet 205 will hereinafter be called the letter pneumatic.

Figure 28:
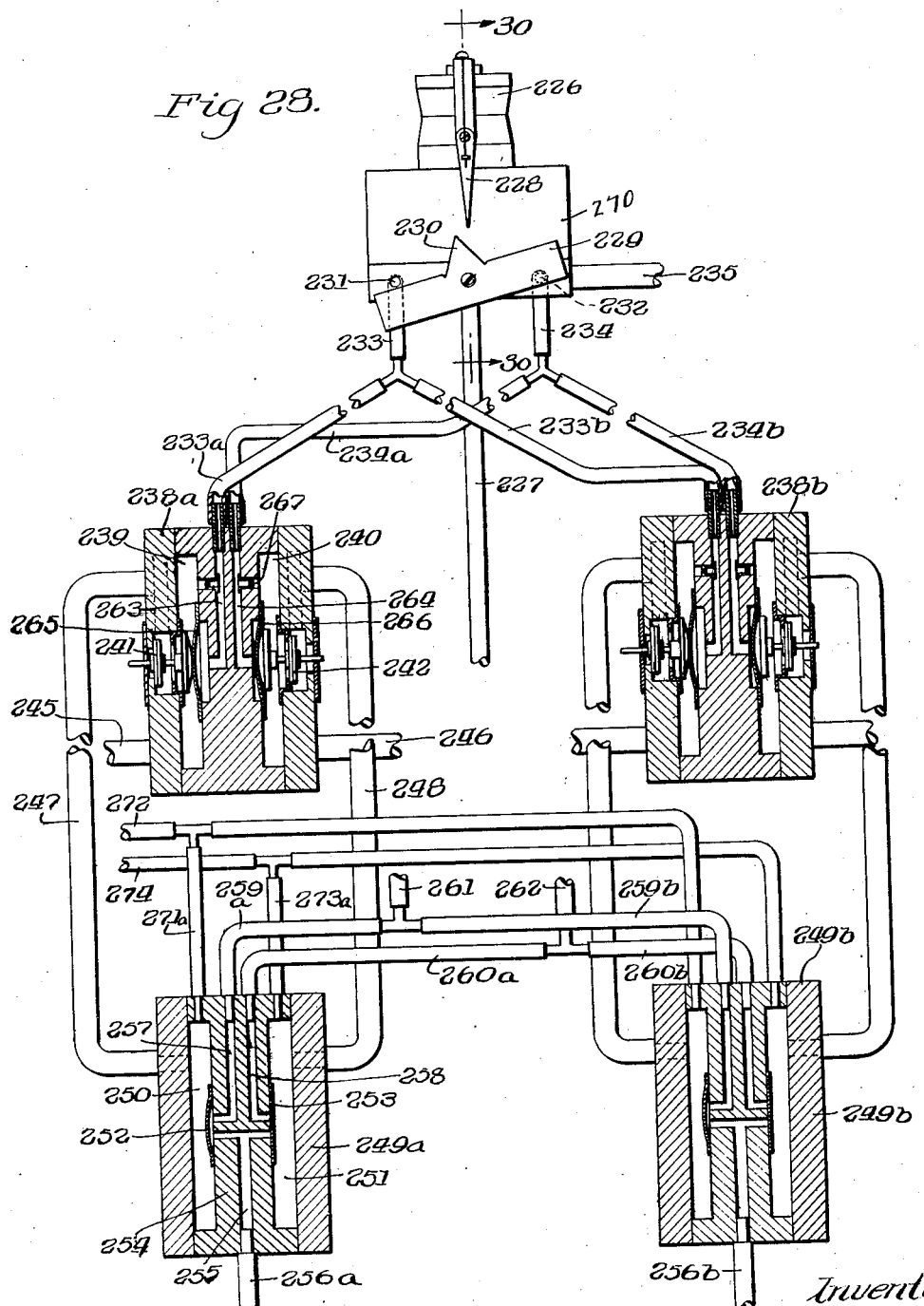
Fig. 28 is in part a diagrammatic view and in part a cross sectional view of the mechanism which is operable to selectively start and stop the letter stencil sheet and the salutation stencil sheet.
Figure 29:
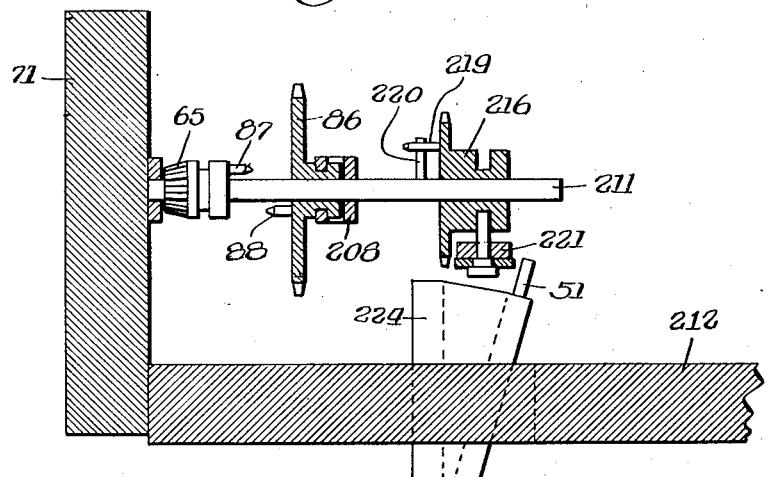
Fig. 29 is a view along the line 29—29 of Fig. 25.
Figure 30:
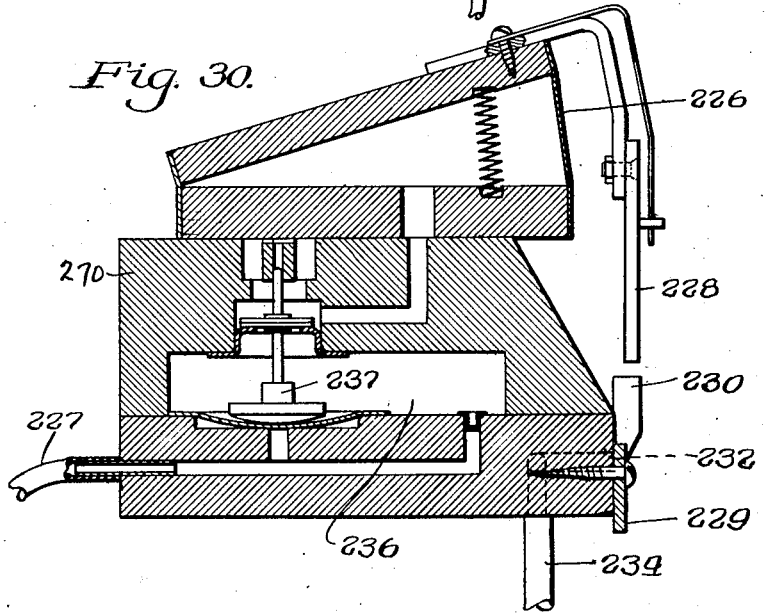
Fig. 30 is a view along the line 30—30 of Fig. 28.

A selector pneumatic 226 shown in Figs. 28 and 30 is connected with the pneumatics 224 and 225 to selectively control their operation, such connection being through a system of conduits and valves diagrammatically shown in Fig. 28. The selector pneumatic 226 operates as a change-over or shifting pneumatic to alternately connect and disconnect the salutation pneumatic 224 and the letter pneumatic 225 with a reduced air conduit system. A tube 227 connects the pneumatic 226 with a primary valve 190 which is located in the control action 181 previously described. A tube 269 leads from the primary valve 190 of the control action to the tracker bars 63. The tube 269 is divided into two branches, not shown, in close proximity to the respective tracker bars 63, with a branch leading to each tracker bar. In the normal order the salutation stencil sheet 206 is first in operation and it is provided with a perforation positioned to register with an aperture in the tracker bar 63, whereby atmosphere is admitted to the tube 269 for an instant and the primary valve 190 operates through the tube 227 to collapse the selector pneumatic 226. A selector finger 228, mounted on the pneumatic 226, is so positioned that collapse of the pneumatic carries the finger downwardly into engagement with a pivotally mounted shutter 229. The shutter 229 has a symmetrically positioned triangular projection 230 at its mid point, with which the descending finger 228 engages or contacts in each of its downward movements and by reason of said contact the shutter 229 is alternately rotated in clock-wise and counter-clockwise directions. In the position shown in Fig. 28 the downward travel of the finger 228 will rotate the shutter 229 in a clock-wise direction thereby closing the opening 231 and opening the aperture 232. The next collapse of the pneumatic 226 causing movement of the finger 228 downwardly, will rotate the shutter 229 back to the position shown in Fig. 28, the shutter 229 being by successive collapses of the pneumatic 226, alternately rotated in clock-wise and counter-clockwise direction. Reduced air is maintained in a chamber 236 formed in a housing 270 which is located beneath and supports the pneumatic 226, the chamber being connected with the conduit system 100 through a tube 235. Admission of atmosphere through the tube 227 opens a valve 237 thereby connecting the pneumatic 226 with the reduced air chamber 236 and causing collapse of the pneumatic. The apertures 231 and 232 open into the tubes 233 and 234, respectively. The tube 233 branches off into the tubes 233a and 233b which connect with control housings 238a and 238b, respectively. Likewise, the tube 234 has branches 234a and 234b, respectively connected with the housings 238a and 238b. The tubes 233a and 234a open into conduits 263 and 264 respectively. Chambers 239 and 240 are positioned on opposite sides of the housing 238a and are respectively separated from the conduits 263 and 264 by diaphragms 265 and 266 for the purpose of controlling the valves 241 and 242 with which the diaphragms operatively connect. The chambers 239 and 240 are connected with the conduit system 100 by the tubes 245 and 246 whereby the chambers are maintained constantly at reduced air pressure.

The housings 238b and 249b, together with all outlet and inlet connections, are duplicates of the housings 238a and 249a and their connections. The left hand portion of the disclosure of Fig. 28 is capable of operation either independently of or in connection with the housings 238b and 249b and their connections. For this reason only the left hand portion of the disclosure of Fig. 28 is numbered and described, although identical operations occur in the right hand portion of the disclosure.

Further describing now the embodiment disclosed by the left hand portion of Fig. 28 as it operates with the shutter 229 in the position therein shown, the conduit 263 is at atmospheric pressure. The conduit 264 has reduced air pressure by reason of the bleeder valve 267 which connects the conduit 264 with the chamber 240. The control housing 238a is connected with a housing 249a by tubes 247 and 248. The housing 249a has a chamber 250 on one side which is at reduced air pressure under the conditions resulting from the position of the shutter 229 as shown, since the chamber 239 with which the chamber 250 is connected by the tube 247 is constantly at reduced air pressure. The tube 248 connects the chamber 251 in the housing 249a with the housing 238a where, by reason of the position of the valve 242, the chamber 251 is at atmospheric pressure. The housing 249a has a mid partition 254, in which is located a plurality of lower T-shaped conduits 255, each of which connects with one of a plurality of tubes 256a leading to the pneumatic action 141 or to the valves in the control action 181. The upper portion of the partition wall 254 contains a plurality of conduits 257 and 258 arranged in pairs which each independently and consecutively connect with one of a plurality of corresponding conduits 255. Whether the conduit 257 or the conduit 258 connects with the corresponding conduit 255 depends upon the position of the diaphragms 252 and 253. As many diaphragms 252 are mounted in the chamber 250 as there as conduits 255 or 257. Similarly there are as many diaphragms 253 in the chamber 251 as there are conduits 255 or 258. When the chamber 250 is at reduced air pressure the diaphragms 252 take the position shown in Fig. 28, thereby connecting the individual conduits 255 with the corresponding conduits 257. Each of the conduits 257 are connected with the salutation tracker bar 63 by a tube 259a which connects with a tube 261, the latter leading directly to the tracker bar. Since each of the tubes 256a are connected either to one of the power pneumatics 142 comprising the pneumatic action 141 or to one of the valves of the control action 181, the salutation stencil sheet 206 controls the operation of the attachment for the position shown in Fig. 28 as it is obvious that there is an open connection from the salutation tracker bar 63 through the tubes 261, the tubes 259a, the conduits 257, the conduits 255, and the tubes 256a.

When the shutter 229 is oppositely tilted from the position shown in Fig. 28, by reason of the collapse of the pneumatic 226, the valves 241 and 242 move to the right as observed in Fig. 28, by the collapse of the diaphragms 265 and 266. The chamber 251 is thereby at reduced air and the chamber 250 approaches atmospheric pressure, with the diaphragms 252 closed and the diaphragms 253 expanded. Expansion of the diaphragms 253 provide connections between the conduits 258 and 255, the diaphragms 252 meantime closing connections between the conduits 255 and the conduits 257. In this position of the shutter 229, the tubes 256a which lead to the pneumatic action 141 or to the control action 181 are connected through the conduits 255, the conduits 258, the tubes 260a and the tubes 262, with the letter tracker 63. It is to be noted that the housing 249a is provided with a battery or plurality of substantially fifty each of the conduits 255 and 257 and 258, the exact number required being dependent upon the number of tracker bar apertures employed or used.

Since for the positions of the device indicated in Fig. 28 the salutation stencil sheet 206 is in control of the pneumatic action 141 and of the control action 181, it is desirable that the pneumatic 226 will automatically collapse at the proper time to put the letter tracker bar and the letter stencil sheet 205 in control. For this purpose the letter pneumatic 225 is connected with the chamber 250 through the tubes 271a and 272, the tube 272 leading directly to the pneumatic. The salutation pneumatic 224 is similarly connected with the chamber 251 through the tubes 273a and 274, the tube 274 leading directly to the pneumatic 224. Since the chamber 250 has reduced air under the conditions shown in Fig. 28, the salutation pneumatic 224 with which the chamber is connected will be in collapse and will remain collapsed while the chamber 250 has vacuum. Upon the collapse of the selector pneumatic 226 the chamber 250 becomes atmospheric and the chamber 251 has air at reduced pressure. This change of pressure conditions in the chambers 250 and 251 following the collapse of the pneumatic 226 operates to collapse the letter pneumatic 225 which is connected with the chamber 251 and to expand the salutation pneumatic 224. This change in the pneumatic 224 and 225 occurs immediately upon the collapse of the selector pneumatic 226 and shifts the clutch lever 221 to start movement of the letter stencil sheet 205 over its tracker bar 63. The shift of control from one stencil sheet to the other is accomplished by providing a perforation in the active stencil sheet in position to register with the tracker bar aperture which is connected by the branched tube 269 with the selector pneumatic 226 through the primary valve 190 and the tube 227. This starts the inactive stencil sheet and stops the sheet actively in control as above described. Thus the control which has been shifted to the letter stencil sheet 205 will continue until the registry of an aperture therein with a corresponding aperture in the tracker bar 63 which will result in the collapse of the pneumatic 226 and a new shift of the control from the letter sheet 205 to the control of the salutation stencil sheet 206.

In Figs. 31 to 34 inclusive, I have shown a machine for perforating the paper to form stencil sheets which control the operation of my automatically controlled typewriter attachment hereinbefore described. The perforator is herein shown as operable by hand yet it is equally adapted for mechanical or electrical drive.

The embodiment shown comprises a frame 321 which has a supply spool 322 and a feed or take up spool 323 suitably mounted therein. A roll of blank paper 324 which is wound upon the supply spool 322 is fed to the take-up spool 323. The sheet of paper 324 in passing from the spool 322 to the spool 323, moves over a punch block 330, the paper being perforated while in contact with the block.

The frame 321 is also provided with a plurality of pivotally mounted key levers 326 and with a spacer lever 327. For the purpose of actuating a feed lever 335 without punching a key lever 326 or the spacer lever 327, I have provided a stud 336 which projects upwardly through the top of the frame 321. By pushing down on the stud 336 the lever 335 is lowered without moving the key levers 326 and the paper is correspondingly advanced without being perforated. The key levers 326 are preferably arranged similarly to the key board of the typewriter which the stencil sheet being perforated is intended to control. Such additional levers as may be necessary to form perforations corresponding to other operations of the typewriter are also provided. Each of the key levers 326 and the lever 327 are mounted upon a pivot rod 354 and rest upon the feed lever 335.

A bottom guide member 329 is positioned immediately above the punch block 330. The sheet of paper 324 in traveling from the spool 322 to the spool 323 passes between the guide member 329 and the block 330. A brake 348 is held in frictional contact with the spool 322 by means of a spring 349, thereby tending to cause retardation of the operation of the spool 322 and keeping the paper 324 stretched taut.

A top guide member 328 is positioned above and spaced apart from the bottom guide member 329. A plurality of wire rods or punches 333 are movably and separably mounted in the top guide member 328, each of the punches 333 being yieldingly held in the position shown in Fig. 34 by means of individual springs 355. Slots 331 and 332 are formed in the guide member 329 and in the punch block 330 respectively; and are in register to provide individual run-ways or guides for the punches 333. The punches 333 are each positioned immediately beneath and with their upper ends in contact with the lower edge of one of the key levers 326, while the lower end of the punches normally stop short of the bottom of the guide member 329 and clear the sheet of paper 324.

A rod 334 provides a stop which limits the upward movement of the key levers 326 and of the spacer lever 327. A spring 337 which is attached to the feed lever 335 yieldingly holds the feed lever in contact with the under edges of the key levers 326 and of the spacer lever 327.

In operation, the key levers 326 or the spacer lever 327 are selectively pushed downward against the resistance of the feed lever 335 and the spring 337, whereby the punch 333, immediately underlying the lever thus punched, forms an aperture in the paper 324. The paper 324 remains stationary during the punching operation and upon release of the punching lever, the punch 333 is moved by the resilience of its spring 355 out of engagement with the paper 324 and the punching lever returns to its initial position in contact with the stop 334, being thus moved by the action of the spring 337 upon the feed lever 335.

The feed lever 335 is forced down by each downward movement of the key lever 326 or of the spacer lever 327. Each upward movement of the feed lever 335 following such downward movement feeds the sheet of paper 324 forwardly, intermittently winding the paper on the take-up spool 323 and unwinding it from the supply spool 322. This forward feed of the paper 324 is accomplished by the actuation of a bell crank 340 which is connected with the feed lever 335 by a link 339. Each upward movement of the feed lever 335 moves the link 339 and the bell crank 340 to actuate a pawl 341. The pawl 341 controls a ratchet wheel 342 and moves the wheel one tooth space for each upward movement of the lever 335. The ratchet wheel 342 is fixedly mounted upon a shaft 346 upon which a gear 345 is also fixedly mounted. The intermittent rotation of the ratchet wheel 342 likewise rotates the gear 345, this intermittent rotation being imparted to a gear 344 through the medium of a pinion 343 positioned between the gear 344 and the gear 345. The gear 344 is fixedly mounted upon a shaft 347, the gear and shaft being rotated in counter-clockwise direction as observed in Figs. 33 and 34. The take-up spool 323 is fixedly mounted upon the shaft 347 and its rotation in counterclockwise direction intermittently feeds the paper 324 off of the suply spool 322 during the return of the feed lever.

The amount the paper is fed forwardly determines the spacing of the typing controlled by the stencil sheet which is being perforated. The positive feed, upon the return of the levers after a perforation has been cut tends to produce spacing of the perforations which uniformly increases with the circumference of the outside winding of the perforated paper on the spool 323. Since a fixed number of actuations of the feeding mechanism produces a complete revolution of the take-up spool 323 and the amount of paper thus fed upon each revolution of the spool depends upon the circumference of the outside winding of the paper, it is obvious that the spacing will gradually increase from a minimum at the beginning of the perforation operation to a maximum spacing at the completion of the operation.

This gradual change in the spacing of the stencil sheet perforations is compensated for by unwinding the paper from the spool 323 and winding it upon a reproducing record spool, not shown. When a stencil sheet has been completed, the sheet of paper 324 is cut off adjacent the punch block 330 and the free end of the stencil sheet is attached to the reproducing record spool. The reproducing record spool is adapted to be removably mounted in the frame 321, being held at one end by a spring clip 350 and at the other by a crank shaft 351. A crank 352 is mounted upon the shaft 351 and enables the completed stencil sheet to be manually unwound from the spool 323 and wound upon the spool. The stencil sheet is thus wound upon the reproducing record spool with the closest perforation spacing on the outer circumference or free end of the stencil sheet. This reproducing record spool is ready for insertion in the typewriter attachment and is the spool given the number 59 in the description of the attachment. In mounting the stencil sheet 58 in the typewriter attachment the free end of the sheet which has the minimum perforation spacing is attached to an empty winding spool 60. The spool 60 is revolved in accordance with the speed of the winding mechanism and it is obvious that the stencil sheet 58 will be wound on the spool 60 at a minimum rate at the beginning because of the small circumference of the initial winding next to the shank of the spool which rate will gradually increase to a maximum at the end of the winding process. The rate of feed of the paper or stencil sheet to the spool 60 will increase in the same ratio as the perforation spacings increase, the diameters of the spools 59 and 60 being the same.

Thus it will be seen that I have provided a perforating machine for forming stencil sheets or the like which is equally adapted for manual, electrical or mechanical feed, and in which the return movement of the key lever results in a positive movement being imparted to the feed mechanism. I have also described a novel method of manually winding and unwinding of the completed stencil sheets whereby upon feeding of the stencil sheet into the attachment, the gradually increasing perforation spaces are compensated for and the resultant typing is uniformly spaced. Thus, notwithstanding there is a variation in the spacings of the stencil sheet perforations, I have provided a method whereby this unequal spacing produces absolutely uniform spacing of the type from beginning to end of the control of the typewriter attachment by the stencil sheet.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a device of the class described, a tracker bar having one face adapted for feeding a stencil sheet thereover, said tracker bar having a main aperture extending therethrough with one terminus in said face, and having a second aperture opening into the main aperture intermediate its ends, the other terminus of the second aperture being in said tracker bar face.

2. In a device of the class described, the combination with a cabinet having an air conduit mounted therein, a power driven pump operable to rarefy the air in the conduit, a plurality of pneumatic actuators operatively connected with said conduit, a pivotally mounted shutter positioned in the conduit intermediate the pump connection and the actuator connections, a bracket on the exterior of the cabinet, a rod having one end connected with the shutter and the other end supported by said bracket, and adjustable means adjacent the bracket adapted to move the rod to control the position of the shutter.

3. In a device of the class described, the combination with a conduit and an air exhaust pump operatively connected with the conduit, of a typewriter having movable instrumentalities, a plurality of pneumatic actuators pneumatically connected with the conduit and operatively connected with the movable instrumentalities of a typewriter, a pivotally mounted shutter positioned in the conduit intermediate said pump connection and the actuator connections, a second pneumatic actuator operatively connected with the case shift key of the typewriter, said last-mentioned actuator being connected with said conduit at a point intermediate said shutter and the connection of the pump with the conduit, whereby said last-mentioned actuator is controlled by air having a higher degree of rarefaction than the air controlling said first-mentioned actuators.

4. In a device of the class described, an automatic operator for typewriters comprising type key actuating means, a stencil sheet for controlling the operation of the key actuating means, a pneumatic actuator operable to return the typewriter carriage and to actuate the line shift of the typewriter upon the completion of a line, means operable to stop operation of the type key actuators while the carriage is being returned, a pair of vertical rods forming guides for the bellows pneumatic and a spring partially supporting the pneumatic during its collapse and while expanding.

5. In a device of the class described, an automatic operator for typewriters comprising type key actuating means, a stencil sheet for controlling the operation of the key actuating means, a bellows pneumatic operable upon collapse to actuate the line shift and to return the typewriter carriage upon the completion of a line, a pair of vertical rods forming guides for the pneumatic, resilient means operable to gradually extend the pneumatic following its collapse, means operable to stop operation of the type key actuators while the carriage is being returned, and means operable by the carriage upon the completion of its return to again start the operation of the type key actuators.

6. In a device of the class described, an automatic operator for typewriters comprising type key actuating means, a stencil sheet for controlling the operation of the key actuating means, a pneumatic actuator operable to return the typewriter carriage upon the completion of a line, pneumatic means operable to stop operation of the type key actuators while the carriage is being returned, and means operable by the carriage upon the completion of its return to again start the operation of the type key actuators, said means being adjustable to vary the position at which the carriage will complete its return.

7. In a device of the class described, an automatic operator for typewriters comprising type key actuating means, a stencil sheet for controlling the operation of the key actuating means, a pneumatic actuator operable to return the typewriter carriage upon the completion of a line, pneumatic means operable to stop operation of the type key actuators while the carriage is being returned, and means operable by the carriage upon the completion of its return to again start the operation of the type key actuators, said means comprising a tube controlling said pneumatic means, a spring plate positioned in the path of the carriage closing said tube, contact of the carriage with the plate opening said tube and causing said pneumatic means to stop said actuators.

8. In a device of the class described, an automatic operator for typewriters comprising type key actuating means, a stencil sheet for controlling the operation of the key actuating means, a pneumatic actuator operable to return the typewriter carriage upon the completion of a line, pneumatic means operable to stop operation of the type key actuators while the carriage is being returned, and means operable by the carriage upon the completion of its return to again start the operation of the type key actuators, said means comprising a tube controlling said pneumatic means, a spring plate positioned in the path of the carriage and closing said tube, contact of the carriage with the plate opening said tube and causing said pneumatic means to stop said actuators, and means for shifting the position at which said plate will operate to cause said pneumatic means to stop the operation of the key actuators.

9. In a device of the class described, a typewriter, a pneumatically controlled attachment for actuating the typewriter, a cabinet on which said typewriter and attachment are mounted, a valve mounted on the cabinet and operable when open to stop the attachment, a second valve mounted on the cabinet and operable when open to start the attachment, a block pivotally mounted on the cabinet in control of said valves, rotation of the block in one direction causing said actuator to stop operating and rotation of the block in the other direction causing said actuator to start operation.

10. In a device of the class described, a typewriter, a pneumatically controlled attachment for actuating the typewriter, a cabinet on which said typewriter and attachment are mounted, a valve mounted on the cabinet and operable when open to stop the attachment, a second valve mounted on the cabinet and operable when open to start the attachment, a block pivotally mounted on the cabinet in control of said valves, rotation of the block in one direction causing said actuator to stop operating and rotation of the block in the other direction causing said actuator to start operation, and a hook operable to hold said block in tilted position.

11. An automatic operator for typewriters comprising type key actuating means, a tracker bar, a stencil sheet movable over the tracker bar for causing the operation of the key actuators, winding mechanism for effecting the feed of said sheet, rewinding mechanism for effecting the retraction of said sheet, a driving shaft, coupling means shiftable to alternately operatively connect said driving shaft with said winding and rewinding mechanism, a power driven bellows, control mechanism operable to shift said coupling means, pneumatic means controlled by the stencil sheet operable to move said control mechanism into the path of said bellows, contact of said bellows with the control mechanism causing said control mechanism to shift said coupling means to disconnect the driving shaft from the winding mechanism and connect said shaft with the rewinding mechanism and means operable upon completion of the winding operation to cause the re-engagement of said driving shaft with said winding mechanism.

12. An automatic operator for typewriters comprising type key actuating means, a tracker bar, a stencil sheet movable over the tracker bar for causing the operation of the key actuators, winding mechanism for effecting the feed of said sheet, rewinding mechanism for effecting the retraction of said sheet, a driving shaft, coupling means shiftable to alternately operatively connect said driving shaft with said winding and rewinding mechanism, a power driven bellows, control mechanism operable to shift said coupling means, pneumatic means controlled by the stencil sheet operable to move said control mechanism into the path of said bellows, contact of said bellows with the control mechanism causing said control mechanism to shift said coupling means to disconnect the driving shaft from the winding mechanism and connect said shaft with the rewinding mechanism, means operable upon completion of the winding operation to cause the re-engagement of said driving shaft with said winding mechanism and manually controlled pneumatic means operable to disengage the winding mechanism and to engage the rewinding mechanism with the driving shaft at any stage of the winding operation.

13. An automatic operator for typewriters comprising type key actuating means, a tracker bar, a stencil sheet movable over the tracker bar for causing the operation of the key actuators, winding mechanism for effecting the feed of said sheet, rewinding mechanism for effecting the retraction of said sheet, a driving shaft, coupling means shiftable to alternately operatively connect said driving shaft with said winding and rewinding mechanism, a power driven bellows, control mechanism operable to shift said coupling means, pneumatic means controlled by the stencil sheet operable to move said control mechanism into the path of said bellows, contact of said bellows with the control mechanism causing said control mechanism to shift said coupling means to disconnect the driving shaft from the winding mechanism and connect said shaft with rewinding mechanism, and manually controlled pneumatic means operable to disengage the winding mechanism and engage the rewinding mechanism with the driving shaft at any stage of the winding operation.

In testimony whereof, I have hereunto signed my name.

SELVIYOR A. SWANSON.